(12) United States Patent
Yao et al.

(10) Patent No.: US 11,657,757 B2
(45) Date of Patent: May 23, 2023

(54) METHOD FOR DRIVING DISPLAY PANEL AND DISPLAY APPARATUS

(71) Applicant: Shanghai Tianma Micro-Electronics Co., Ltd., Shanghai (CN)

(72) Inventors: Qijun Yao, Shanghai (CN); Xingyao Zhou, Shanghai (CN); Shui He, Xiamen (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 76 days.

(21) Appl. No.: 17/364,485

(22) Filed: Jun. 30, 2021

(65) Prior Publication Data
US 2021/0326564 A1 Oct. 21, 2021

(30) Foreign Application Priority Data

Apr. 30, 2021 (CN) .......................... 202110481310.X

(51) Int. Cl.
*G09G 3/3233* (2016.01)
*G06V 40/13* (2022.01)
*G06F 3/0354* (2013.01)
*G02F 1/1333* (2006.01)

(52) U.S. Cl.
CPC ....... *G09G 3/3233* (2013.01); *G02F 1/13338* (2013.01); *G06F 3/03547* (2013.01); *G06V 40/1318* (2022.01)

(58) Field of Classification Search
CPC ............... G06V 40/13; G06V 40/1318; G06V 40/12–1394; G02F 1/13338; G06F 3/03547; G06F 3/041–047; G09G 3/3233; G09G 2320/0626; G09G 2354/00; G09G 3/3266; G09G 3/2074
See application file for complete search history.

(56) References Cited

U.S. PATENT DOCUMENTS

| | | | |
|---|---|---|---|
| 2016/0188075 A1* | 6/2016 | Fu ........................ | G09G 3/3677 345/174 |
| 2017/0200036 A1* | 7/2017 | Wang ................. | G06V 40/1306 |
| 2020/0005706 A1* | 1/2020 | Li ....................... | G06V 40/1318 |
| 2020/0273401 A1* | 8/2020 | Lee ................... | G06F 3/041661 |

FOREIGN PATENT DOCUMENTS

| | | |
|---|---|---|
| CN | 109241940 A | 1/2019 |
| CN | 110287842 A | 9/2019 |

* cited by examiner

*Primary Examiner* — Roberto W Flores
(74) *Attorney, Agent, or Firm* — Christensen O'Connor Johnson Kindness PLLC

(57) ABSTRACT

A method for driving a display panel and a display apparatus are provided. The display panel includes a display region including a fingerprint recognition region and includes subpixels located in the display region, and the subpixels include first subpixels located in the fingerprint recognition region and used as a light source for fingerprint recognition. In a first mode, the subpixels are scanned at a first frequency, and in the second mode, the subpixels are scanned at a second frequency. The second frequency is greater than the first frequency. The method includes: when the display panel is in the first mode, monitoring whether the display panel receives a fingerprint recognition requirement, and if yes, controlling the display panel to enter a trigger state; and when the display panel is in the trigger state, scanning the first subpixels at a frequency greater than the first frequency.

19 Claims, 21 Drawing Sheets

METHOD FOR DRIVING DISPLAY PANEL AND DISPLAY APPARATUS

CROSS-REFERENCE TO RELATED APPLICATIONS

The present application claims priority to Chinese Patent Application No. 202110481310.X, filed on Apr. 30, 2021, the content of which is incorporated herein by reference in its entirety.

TECHNICAL FIELD

The present disclosure relates to the field of display technologies, and in particular, to a method for driving a display panel and a display apparatus.

BACKGROUND

In the under-screen fingerprint recognition technology, a light-emitting element in a display panel is usually used as a fingerprint recognition light source. To improve recognition precision, the light-emitting element used as the fingerprint recognition light source needs have a relatively large brightness. However, when the display panel is in a standby mode or other display mode, it is difficult to meet a requirement on the large brightness of the fingerprint recognition light source.

SUMMARY

According to one aspect, an embodiment of the present disclosure provides a method for driving a display panel. The display panel has a display region including a fingerprint recognition region and includes subpixels located in the display region, and the subpixels include first subpixels located in the fingerprint recognition region and are used as a light source for fingerprint recognition. The display panel has working modes including a first mode and a second mode. In the first mode, the subpixels are scanned at a first frequency. In the second mode, the subpixels are scanned at a second frequency, and the second frequency is greater than the first frequency. The method includes: when the display panel is in the first mode, monitoring whether the display panel receives a fingerprint recognition requirement, and if it is monitored that the display panel receives the fingerprint recognition requirement, controlling the display panel to enter a trigger state; and when the display panel is in the trigger state, scanning the first subpixels at a frequency greater than the first frequency.

According to another aspect, an embodiment of the present disclosure provides a display apparatus, and the display apparatus includes a display pane and a driving chip. The display panel has a display region including a fingerprint recognition region and includes subpixels located in the display region, and the subpixels include first subpixels located in the fingerprint recognition region and are used as a light source for fingerprint recognition. The driving chip includes a first driving module, a second driving module electrically connected to the first driving module, and a third driving module electrically connected to the second driving module. The first driving module is configured to control the display panel to be in a first mode in such a manner that the display panel scans the subpixels at a first frequency, or is configured to control the display panel to be in a second mode in such a manner that the display panel scans the subpixels at a second frequency, wherein the second frequency is greater than the first frequency. The second driving module is configured to monitor, when the display panel is in the first mode, whether the display panel receives a fingerprint recognition requirement, and if it is determined that the display panel receives the fingerprint recognition requirement, the second driving module is configured to transmit a trigger instruction. The third driving module is configured to: after receiving the trigger instruction, control the display panel to be in a trigger state in such a manner that the display panel scans the first subpixels at a frequency greater than the first frequency.

BRIEF DESCRIPTION OF THE DRAWINGS

To describe the technical solutions in the embodiments of the present disclosure more clearly, the following briefly describes the accompanying drawings required to be used in the embodiments. The accompanying drawings in the following description show merely some embodiments of the present disclosure, and persons of ordinary skill in the art may still derive other drawings from these accompanying drawings without creative efforts.

DETAILED DESCRIPTION

For a better understanding of the technical solutions of the present disclosure, the following describes in detail the embodiments of the present disclosure with reference to the accompanying drawings.

It should be noted that, the described embodiments are merely some but not all of the embodiments of the present disclosure. All other embodiments obtained by persons of ordinary skill in the art based on the embodiments of the present disclosure shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that, the term "and/or" used in this specification describes only an association relationship of associated objects and represents that three relationships may exist. For example, A and/or B may represent the following three cases: A alone, A and B, and B alone. In addition, the character "/" in this specification generally indicates an "or" relationship between the associated objects.

A display panel has a plurality of working modes. When the display panel is in a mode such as a standby mode or a static image display mode, to reduce power consumption, the display panel usually scans subpixels at a relatively low frequency.

A display period of one frame of image of the display panel includes a driving phase and a holding phase. The display panel scans the subpixels row by row in the driving phase, and stops outputting a scanning signal in the holding phase. For low frequency scanning, the holding phase in the display period of one frame of an image is relatively long, and after the subpixel is charged, a subsequent charging can be performed within a display period of a frame of a next image only after a relatively long stagnation time. This causes a relatively stagnant response of the subpixel. In addition, in a low frequency working mode, brightness improvement stagnates when the subpixel changes from a dark state to a bright state. Therefore, if a fingerprint recognition requirement is detected when the display panel performs low frequency scanning, brightness improvement of the subpixel is very slow. Consequently, a recognition response time will be excessively long.

Figure 1:
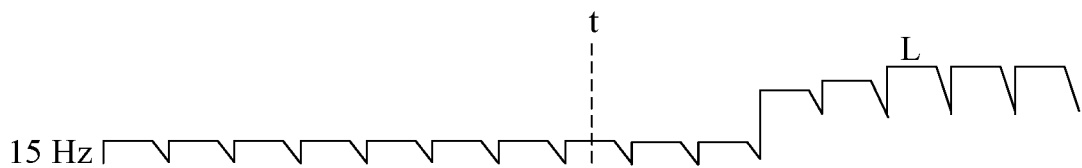
FIG. 1 is a schematic diagram of changes in brightness of a subpixel according to an embodiment of the present disclosure.

FIG. 1 is a schematic diagram of changes in brightness of a subpixel according to an embodiment of the present disclosure. When a display panel scans the subpixel at relatively low frequency of 15 Hz, and when a fingerprint recognition requirement is detected at a moment t, brightness of the subpixel can be improved to a brightness L required by fingerprint recognition only in a very slow manner.

Figure 2:
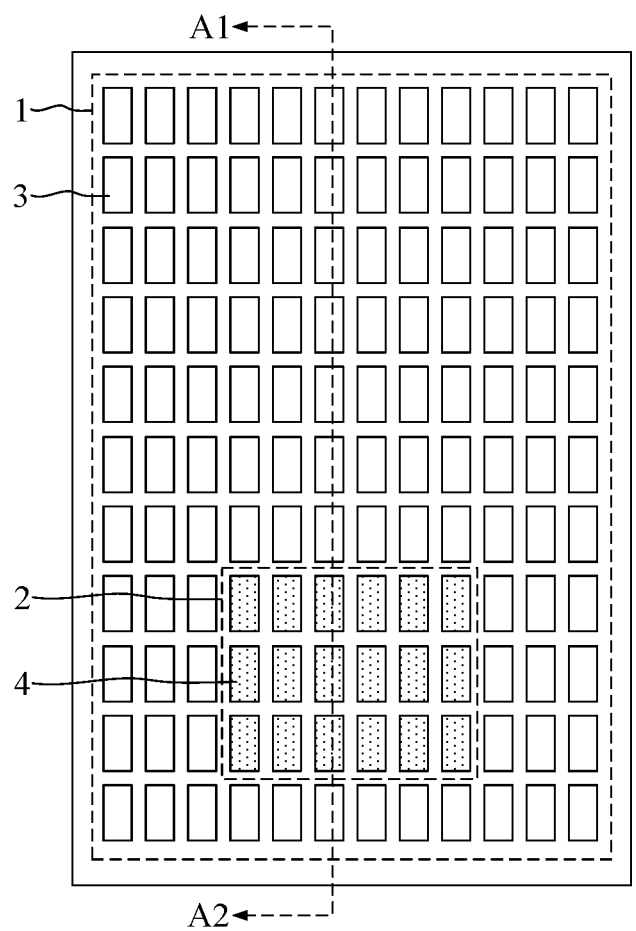
FIG. 2 is a schematic diagram of a display panel according to an embodiment of the present disclosure.
Figure 3:
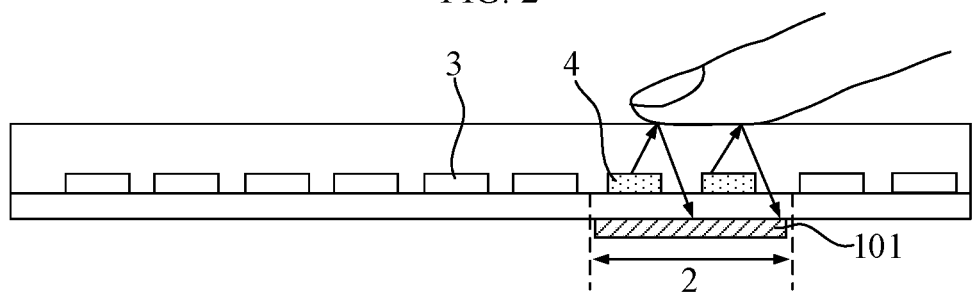
FIG. 3 is a cross-sectional view of FIG. 2 along a direction A1-A2 according to an embodiment of the present disclosure.

In view of this, an embodiment of the present disclosure provides a method for driving a display panel. FIG. 2 is a schematic diagram of a display panel according to an embodiment of the present disclosure. As shown in FIG. 2, the display panel has a display region 1 including a fingerprint recognition region 2, and including a plurality of subpixels 3 located in the display region 1. The subpixels 3 include a plurality of first subpixels 4 located in the fingerprint recognition region 2, which are suitable for use as a light source for fingerprint recognition. FIG. 3 is a cross-sectional view of FIG. 2 along a direction A1-A2. As shown in FIG. 3, when the display panel performs fingerprint recognition, light emitted by the first subpixels 4 is transmitted to a finger and is reflected by the finger, the reflected light is incident to a fingerprint recognition module 101. The fingerprint recognition module 101 collects light reflected from different positions, generates an image of a fingerprint at the different positions, and further obtains a complete fingerprint image through combination and analysis.

FIG. 2 shows an example in which the fingerprint recognition region 2 is a partial region of the display region 1. In another embodiment of the present disclosure, the fingerprint recognition region 2 can be an entire region of the display region 1. FIG. 2 shows an example in which the fingerprint recognition region 2 includes three rows and six columns of the subpixels 3. A quantity and arrangement positions of the subpixels provided in the fingerprint recognition region 2 can be set based on an actual requirement.

Working modes of the display panel include a first mode and a second mode, in the first mode, the subpixel 3 is scanned at a first frequency; and in the second mode, the subpixel 3 is scanned at a second frequency, and the second frequency is greater than the first frequency. For example, the first mode is a mode in which a scanning frequency is relatively low, such as a standby mode or a static image display mode, and the second mode is a mode in which a scanning frequency is relatively high, such as a dynamic image display mode.

Figure 4:
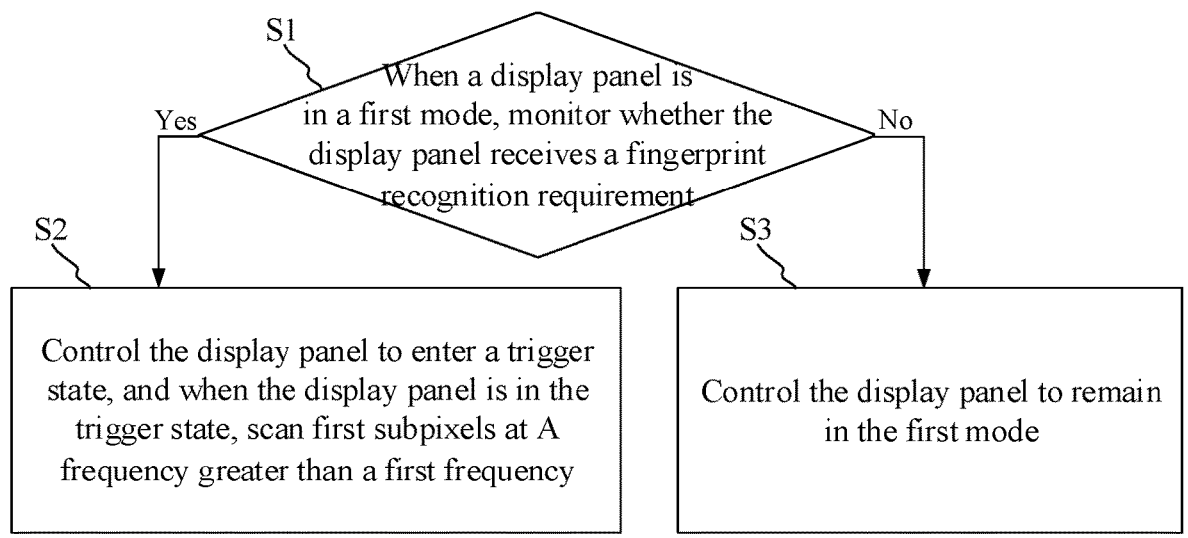
FIG. 4 is a flowchart of a method for driving a display panel according to an embodiment of the present disclosure.

FIG. 4 is a flowchart of a method for driving the display panel according to an embodiment of the present disclosure. As shown in FIG. 4, the method includes step S1, step S2, and step S3.

At step S1, when the display panel is in the first mode, whether the display panel receives the fingerprint recognition requirement is monitored, and if it is monitored that the display panel receives the fingerprint recognition requirement, step S2 is performed, or if it is monitored that the display panel does not receive the fingerprint recognition requirement, step S3 is performed.

At step S2, the display panel is controlled to enter a trigger state, and when the display panel is in the trigger state, at least the first subpixels 4 is scanned at a frequency greater than the first frequency.

At step S3, the display panel is controlled to remain in the first mode.

In the foregoing driving method, when the display panel is in the first mode in which scanning is performed at a relatively low frequency, if the display panel receives the fingerprint recognition requirement, the display panel scans the first subpixels 4 in the fingerprint recognition region 2 at a frequency greater than the first frequency, so that a refresh frequency of the first subpixels 4 in the fingerprint recognition region 2 can be increased. After being charged, the first subpixels 4 can be charged for a second time within a display period of a next frame of image with only a relatively short pause time, thereby quickly improving brightness of the first subpixels 4.

In this embodiment of the present disclosure, after the display panel receives the fingerprint recognition requirement, a process of quickly improving the brightness of the first subpixels 4 is added, which not only shortens a fingerprint recognition response time and enhances user experience, but also quickly improves overall brightness of the fingerprint recognition region 2. In subsequent fingerprint recognition, more light is incident to a finger through the fingerprint recognition region 2, and a fingerprint image acquired by a fingerprint recognition module is clearer, so that recognition precision of the fingerprint is higher.

Figure 5:
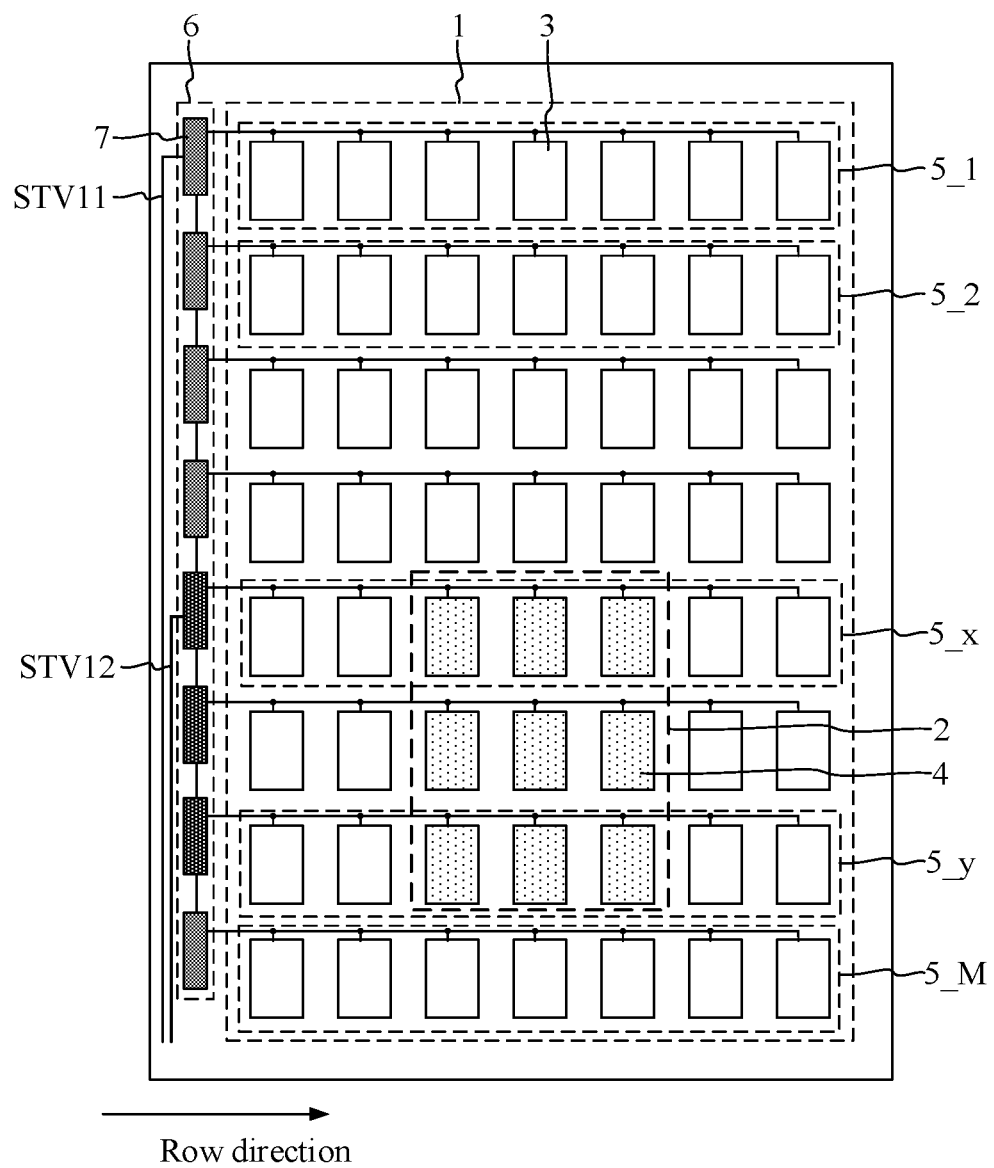
FIG. 5 is a schematic diagram of a scanning driving circuit according to an embodiment of the present disclosure.

FIG. 5 is a schematic diagram of a scanning driving circuit 6 according to an embodiment of the present disclosure. In an embodiment, as shown in FIG. 5, the display panel further includes M pixel rows 5 (for clear illustration, in FIG. 5, a reference sign of an $a^{th}$ pixel row 5 is represented by 5_a, where a=1, . . . , and M). Each pixel row 5 includes a plurality of subpixels 3 arranged along a row direction. The first subpixels 4 are located in an $x^{th}$ pixel row 5 to a $y^{th}$ pixel row 5, where 1≤x<y≤M, and M is a positive integer greater than 1. The display panel can further include a scanning driving circuit 6, and the scanning driving circuit 6 is electrically connected to a first scanning frame start signal line STV11, a second scanning frame start signal line STV12, and the M pixel rows 5.

Figure 6:
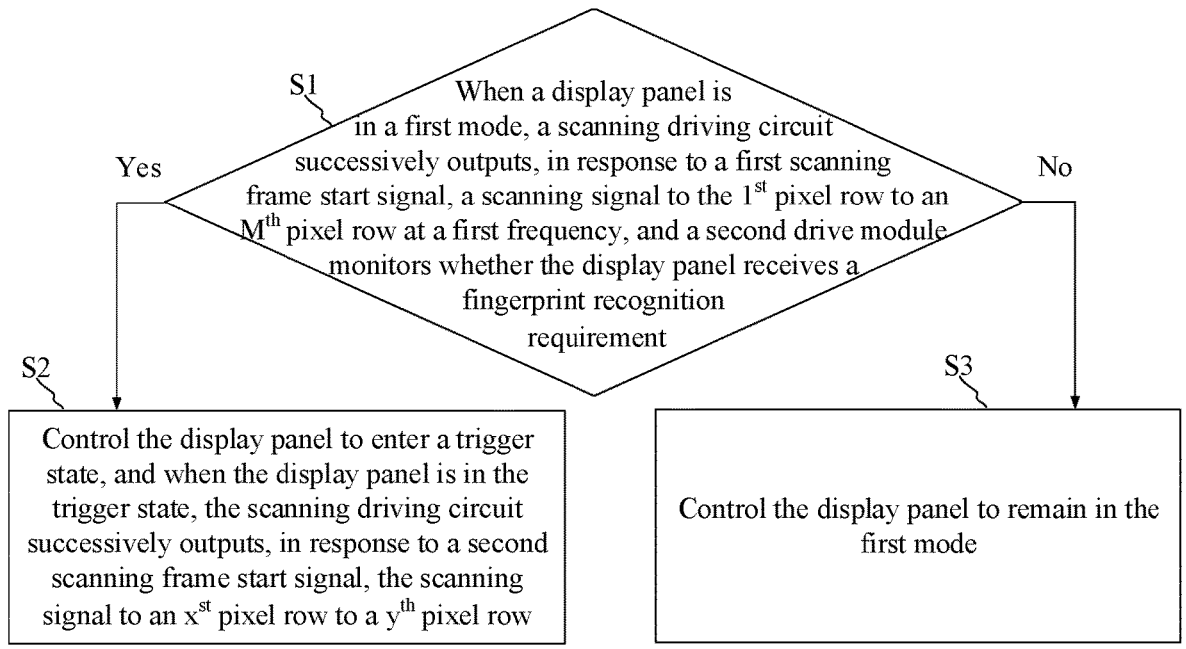
FIG. 6 is another flowchart of a method for driving a display panel according to an embodiment of the present disclosure.

FIG. 6 is another flowchart of a method for driving the display panel according to an embodiment of the present disclosure. When the display panel is in the first mode, the scanning driving circuit 6 successively outputs, in response to a first scanning frame start signal, a scanning signal to the $1^{st}$ pixel row 5 to an $M^{th}$ pixel row 5 at the first frequency, to implement normal light-emitting of the subpixels 3 in the entire display region 1. When the display panel is in the trigger state, the scanning driving circuit 6 successively outputs, in response to a second scanning frame start signal, the scanning signal to at least the $x^{th}$ pixel row 5 to the $y^{th}$ pixel row 5 at a frequency greater than the first frequency, to improve a refresh frequency of the first subpixels 4 in the $x^{th}$ pixel row 5 to the $y^{th}$ pixel row 5, to enable brightness of the first subpixels 4 to be quickly improved to brightness required by fingerprint recognition.

The following uses two types of structures of the scanning driving circuit 6 as an example, to provide two driving manners of the scanning driving circuit 6 for description.

First Driving Manner:

Referring to FIG. 5 again, the scanning driving circuit 6 can include N1 cascaded first scanning shift units 7 electrically connected to the M pixel rows 5, and an $i^{th}$ first scanning shift unit 7 is electrically connected to the $x^{th}$ pixel row 5, where N1 is a positive integer greater than 1, and 1≤i<N1. The first scanning frame start signal line STV11 is electrically connected to the $1^{st}$ first scanning shift unit 7, and the second scanning frame start signal line STV12 is electrically connected to the $i^{th}$ first scanning shift unit 7.

It should be noted that a quantity N1 of the first scanning shift units 7 and a quantity M of the pixel rows 5 can be the same or may be different. FIG. 5 shows an example in which N1=M. When N1=M, the N1 cascaded first scanning shift units 7 are electrically connected to the M pixel rows 5 in a one-to-one correspondence. In another embodiment of the present disclosure, it can be set that $$N1 = \frac{M}{2},$$

and in this case, one first scanning shift unit 7 is electrically connected to two pixel rows 5.

Figure 7:
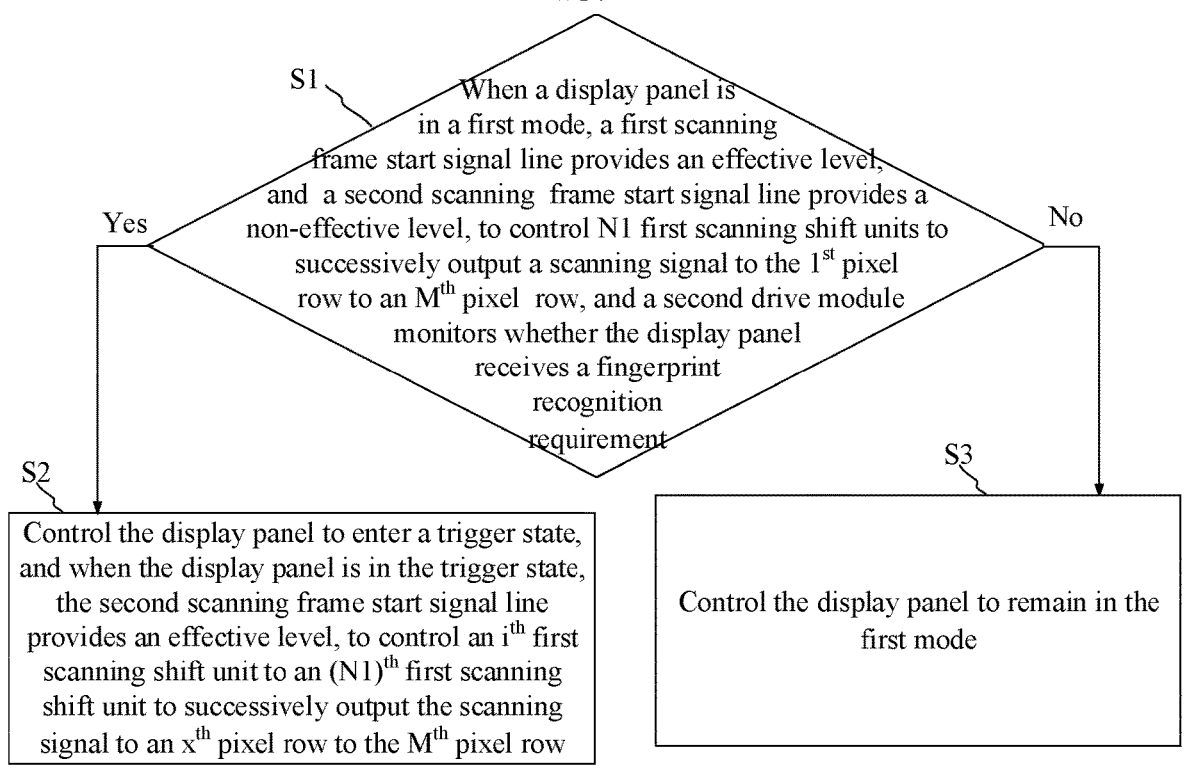
FIG. 7 is still another flowchart of a method for driving a display panel according to an embodiment of the present disclosure.

FIG. 7 is still another flowchart of a driving method according to an embodiment of the present disclosure. A process in which the scanning driving circuit 6 outputs the scanning signal to the $1^{st}$ pixel row 5 to the $M^{th}$ pixel row 5 includes: the first scanning frame start signal line STV11 provides an effective level, and the second scanning frame start signal line STV12 provides a non-effective level, to control the N1 first scanning shift units 7 to successively output the scanning signal to the $1^{st}$ pixel row 5 to the $M^{th}$ pixel row 5. A process in which the scanning driving circuit 6 outputs the scanning signal to at least the $x^{th}$ pixel row to the $y^{th}$ pixel row 5 includes: the second scanning frame start signal line STV12 provides an effective level, to control the $i^{th}$ first scanning shift unit 7 to an $(N1)^{th}$ first scanning shift unit 7 to successively output the scanning signal to the $x^{th}$ pixel row 5 to the $M^{th}$ pixel row 5.

In the foregoing driving manner, in one aspect, a circuit structure of the scanning driving circuit 6 does not need to be changed, and only one second scanning frame start signal line STV12 connected to the $i^{th}$ first scanning shift unit 7 needs to be additionally provided, so that in the trigger state, the $i^{th}$ first scanning shift unit 7 to the $(N1)^{th}$ first scanning shift unit 7 independently scan the $x^{th}$ pixel row 5 to the $M^{th}$ pixel row 5. This driving manner simplifies a structure design of the scanning driving circuit 6, and avoids a case in which the scanning driving circuit 6 occupies a relatively large bezel width in the display panel. This is more conducive to implementation of a narrow bezel design of the display panel. In another aspect, in the trigger state, in the foregoing driving manner, only the $x^{th}$ pixel row 5 to the $M^{th}$ pixel row 5 are scanned at a relatively high frequency. Compared with a case in which an entire screen is switched to high frequency scanning, this reduces power consumption, and further shortens a brightness improvement time of the fingerprint recognition region 2.

Figure 8:
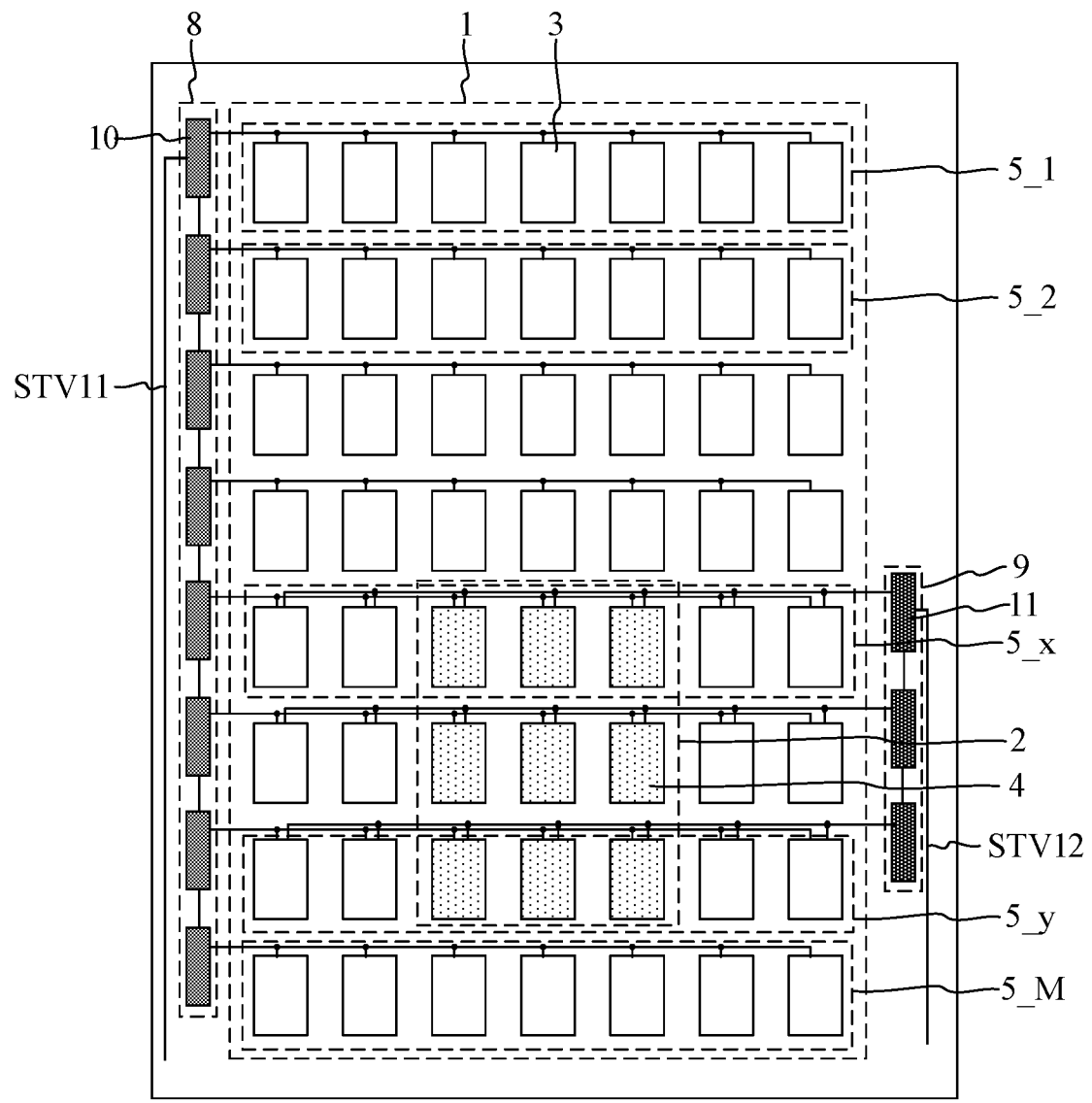
FIG. 8 is another schematic diagram of a scanning driving circuit according to an embodiment of the present disclosure.

Second Driving Manner:

FIG. 8 is another schematic diagram of a scanning driving circuit 6 according to an embodiment of the present disclosure. As shown in FIG. 8, the scanning driving circuit 6 can include a first scanning driving circuit 8 and a second scanning driving circuit 9. The first scanning driving circuit 8 includes N1 cascaded second scanning shift units 10. The N1 second scanning shift units 10 are electrically connected to the M pixel rows 5, and N1 is a positive integer greater than 1. The second scanning driving circuit 9 includes N2 cascaded third scanning shift units 11. The N2 third scanning shift units 11 are electrically connected to the $x^{th}$ pixel row 5 to the $y^{th}$ pixel row 5, and N2 is a positive integer greater than 1.

The first scanning frame start signal line STV11 is electrically connected to the $1^{st}$ second scanning shift unit 10 in the first scanning driving circuit 8, and the second scanning frame start signal line STV12 is electrically connected to the $1^{st}$ third scanning shift unit 11 in the second scanning driving circuit 9.

It should be noted that a quantity N1 of the second scanning shift units 10 and the quantity M of the pixel rows 5 may be the same or may be different, and a quantity N2 of the third scanning shift units 11 and a quantity (y−x+1) of the $x^{th}$ pixel row 5 to the $y^{th}$ pixel row 5 may be the same or may be different. FIG. 8 shows an example in which N1=M and N2=y−x+1. When N1=M, the N1 cascaded second scanning shift units 10 are electrically connected to the M pixel rows 5 in a one-to-one correspondence. When N2=y−x+1, the N2 cascaded third scanning shift units 11 are electrically connected to the $x^{th}$ pixel row 5 to the $y^{th}$ pixel row 5 in a one-to-one correspondence. In another embodiment of the present disclosure, $$N1 = \frac{M}{2}, \text{ and } N2 = \frac{y-x+1}{2},$$

and in this case, one second scanning shift unit 10 is electrically connected to two pixel rows 5, and one third scanning shift unit 11 is also electrically connected to two pixel rows 5.

Figure 9:
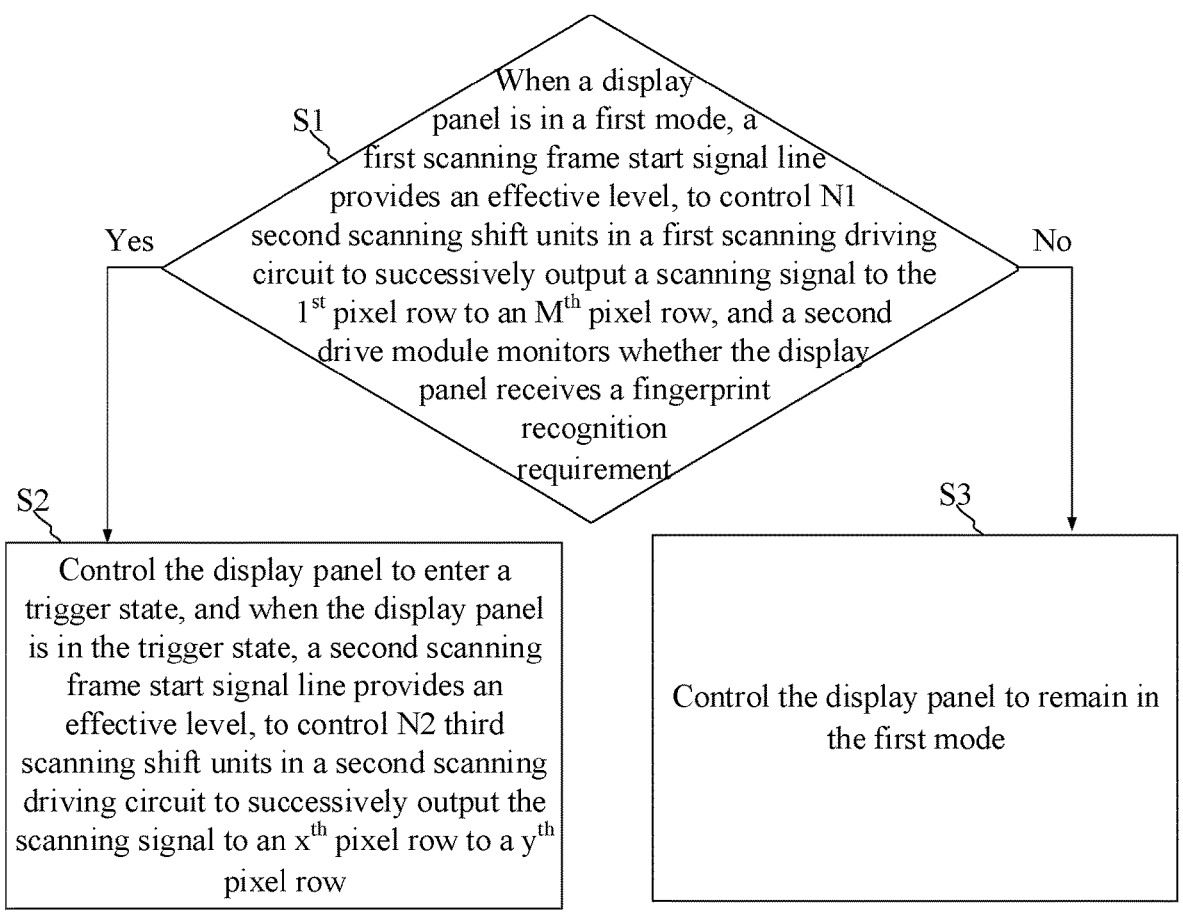
FIG. 9 is yet another flowchart of a method for driving a display panel according to an embodiment of the present disclosure.

FIG. 9 is yet another flowchart of a driving method according to an embodiment of the present disclosure. A process in which the scanning driving circuit 6 outputs the scanning signal to the $1^{st}$ pixel row 5 to the $M^{th}$ pixel row 5 includes: The first scanning frame start signal line STV11 provides an effective level, to control the N1 second scanning shift units 10 in the first scanning driving circuit 8 to successively output the scanning signal to the $1^{st}$ pixel row 5 to the $M^{th}$ pixel row 5. A process in which the scanning driving circuit 6 outputs the scanning signal to at least the $x^{th}$ pixel row 5 to the $y^{th}$ pixel row 5 includes: The second scanning frame start signal line STV12 provides an effective level, to control the N2 third scanning shift units 11 in the second scanning driving circuit 9 to successively output the scanning signal to the $x^{th}$ pixel row 5 to the $y^{th}$ pixel row 5.

In the foregoing driving manner, the second scanning driving circuit 9 can independently scan the $x^{th}$ pixel row 5 to the $y^{th}$ pixel row 5, and a scanning manner is more flexible. When y<M, in the trigger state, the display panel can perform high frequency scanning only on the $x^{th}$ pixel row 5 to the $y^{th}$ pixel row 5, and does not need to scan the $y^{th}$ pixel row 5 to the $M^{th}$ pixel row 5, which reduces power consumption and shortens a brightness improvement time of the fingerprint recognition region 2.

With such a driving manner, in the trigger state, a limitation on a setting position of the fingerprint recognition region 2 is relatively small, and the fingerprint recognition region 2 is not limited to be set on a bottom portion of the display region 1, because high frequency scanning is performed only on pixel rows 5 in which the first subpixels 4 are located, and the last pixel row does not need to be scanned. Even if the fingerprint recognition region 2 is set on a top portion or in the middle of the display region 1, the brightness improvement time is not affected, which improves flexibility of the setting position of the fingerprint recognition region 2.

Figure 10:
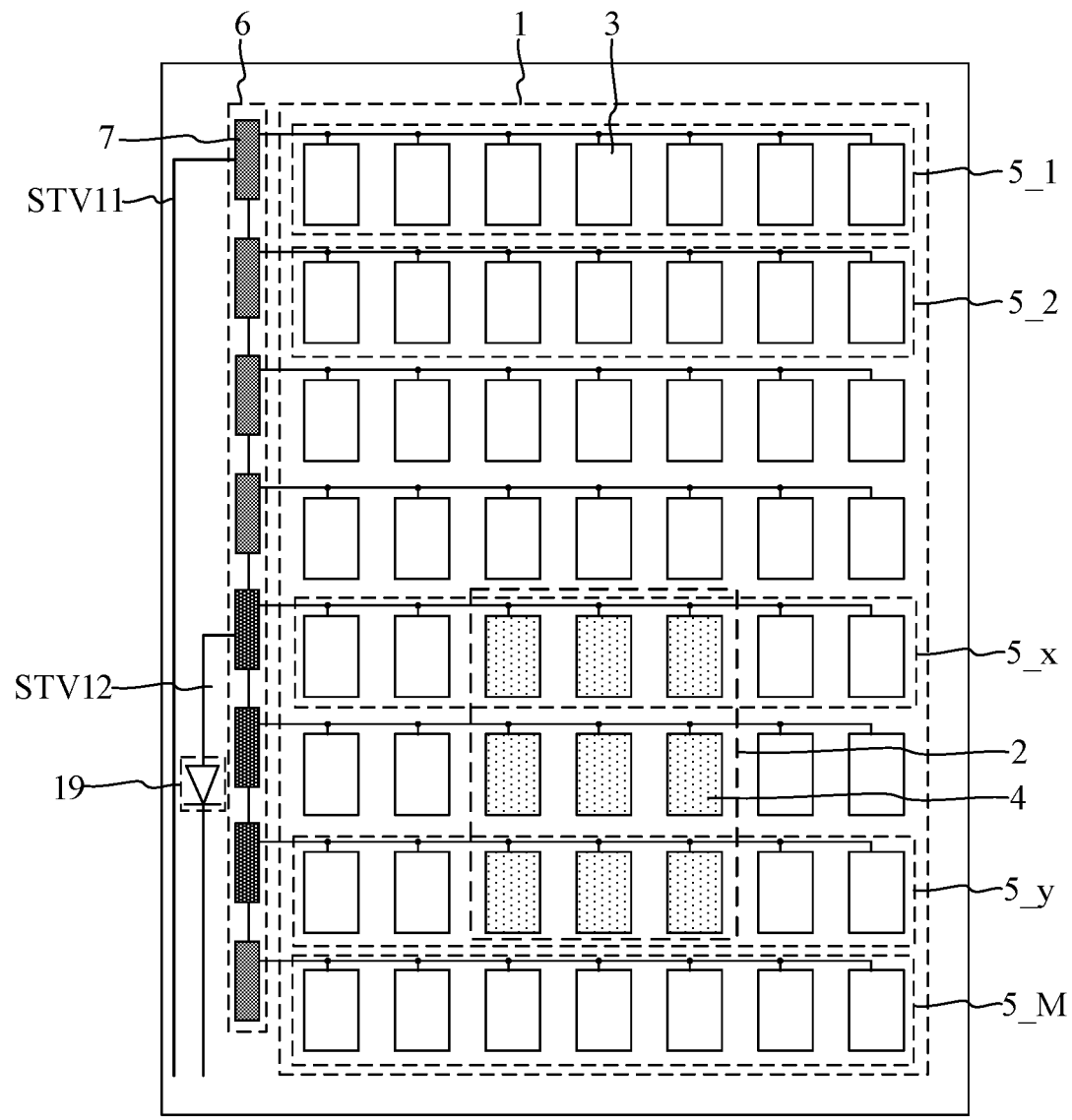
FIG. 10 is a schematic diagram of a first suppression module according to an embodiment of the present disclosure.

FIG. 10 is a schematic diagram a first suppression module 19 according to an embodiment of the present disclosure. In an implementation, as shown in FIG. 10, the second scanning frame start signal line STV12 is connected to the first suppression module 19 in series. In a process in which the scanning driving circuit 6 successively outputs, in response to the first scanning frame start signal, the scanning signal to the $1^{st}$ pixel row 5 to the $M^{th}$ pixel row 5, the first suppression module 19 is configured to suppress signal transmission on the second scanning frame start signal line STV12, to avoid a case in which the scanning driving circuit 6 is driven by the second scanning frame start signal in this process, thereby improving reliability of a working state of the display panel.

Figure 11:
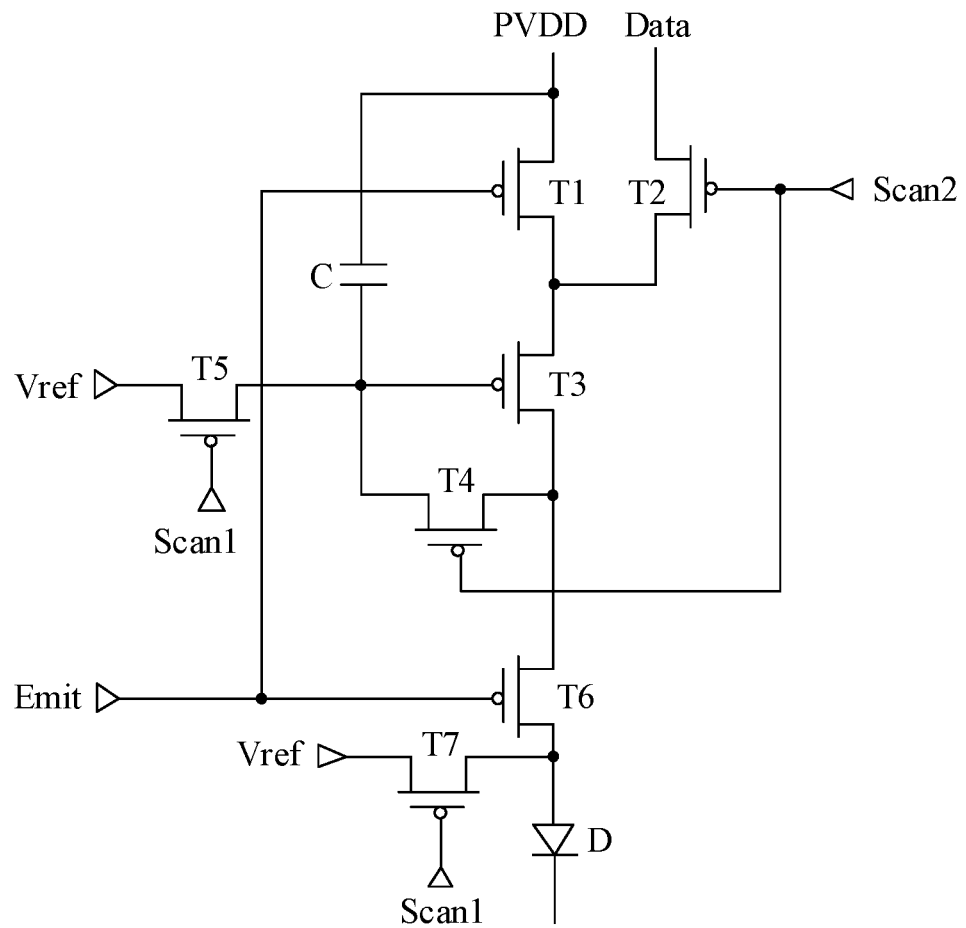
FIG. 11 is a schematic diagram of a pixel circuit according to an embodiment of the present disclosure.
Figure 12:
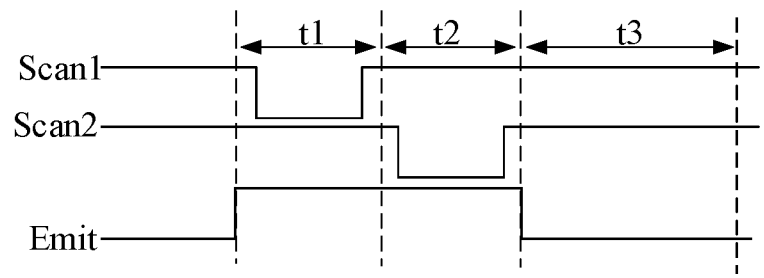
FIG. 12 is a time sequence diagram of a scanning signal and an emission signal according to an embodiment of the present disclosure.

To realize a normal light emission of the subpixel 3, the subpixel 3 can be driven by an emission signal in addition to be driven by the scanning signal. A pixel circuit shown in FIG. 11 is taken as an example. With reference to a signal time sequence diagram shown in FIG. 12, a pixel circuit in the subpixels 3 can include a capacitor C, and a first transistor T1 to a seventh transistor T7. One driving period of the pixel circuit includes an initialization period t1, a charging period t2, and a light-emitting control period t3. In the initialization period t1, the fifth transistor T5 and the seventh transistor T7 respectively reset, in response to a first scanning signal Scan1, a gate of the third transistor T3 and an anode of a light emitting diode D by using a reset signal Vref. In the charging period t2, the second transistor T2 and the fourth transistor T4 write, in response to a second scanning signal Scan2, a data signal Data to the third transistor T3. In the light-emitting control period t3, the first transistor T1 and the sixth transistor T6 control, in response to an emission signal Emit, the light emitting diode D to emit light under function of a driving current converted by the data signal Data and a power supply signal PVDD, where a current flowing to the light emitting diode D is $$I = \frac{1}{2} \mu_n C_{ox} \frac{W}{L} (V_{PVDD} - V_{Data})^2,$$

$\mu_n$ denotes an electron migration rate, $C_{ox}$ denotes a capacitance per unit area at a gate oxide layer, $$\frac{W}{L}$$

denotes a width-to-length ratio of channels of the third transistor T3, $V_{PVDD}$ denotes a power supply voltage, and $V_{Data}$ is a data voltage.

Figure 13:
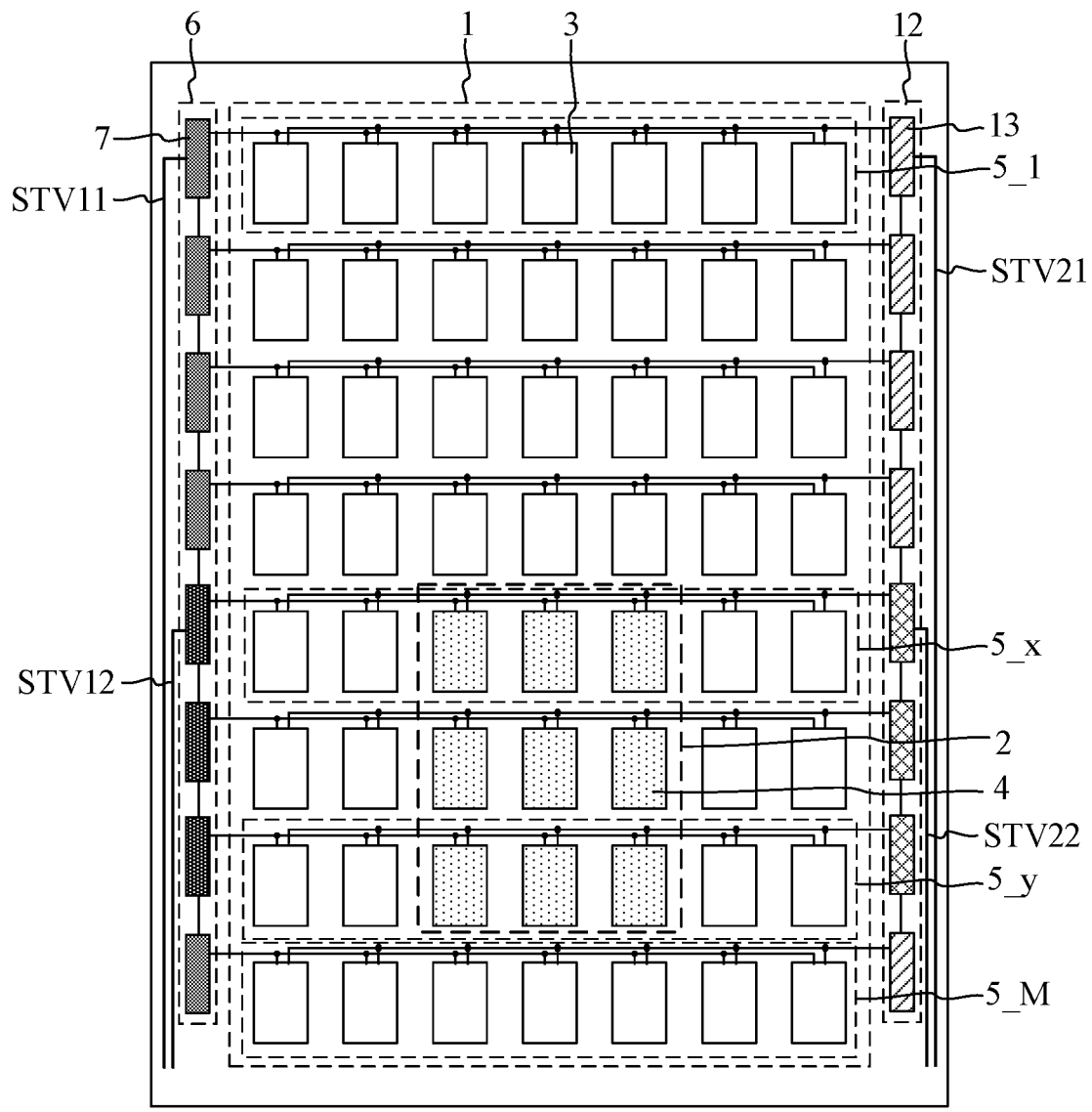
FIG. 13 is a schematic diagram of an emission driving circuit according to an embodiment of the present disclosure.

FIG. 13 is a schematic diagram of an emission driving circuit 12 according to an embodiment of the present disclosure, the display panel further includes the emission driving circuit 12, and the emission driving circuit 12 is electrically connected to a first emission frame start signal line STV21, a second emission frame start signal line STV22, and the M pixel rows 5.

Figure 14:
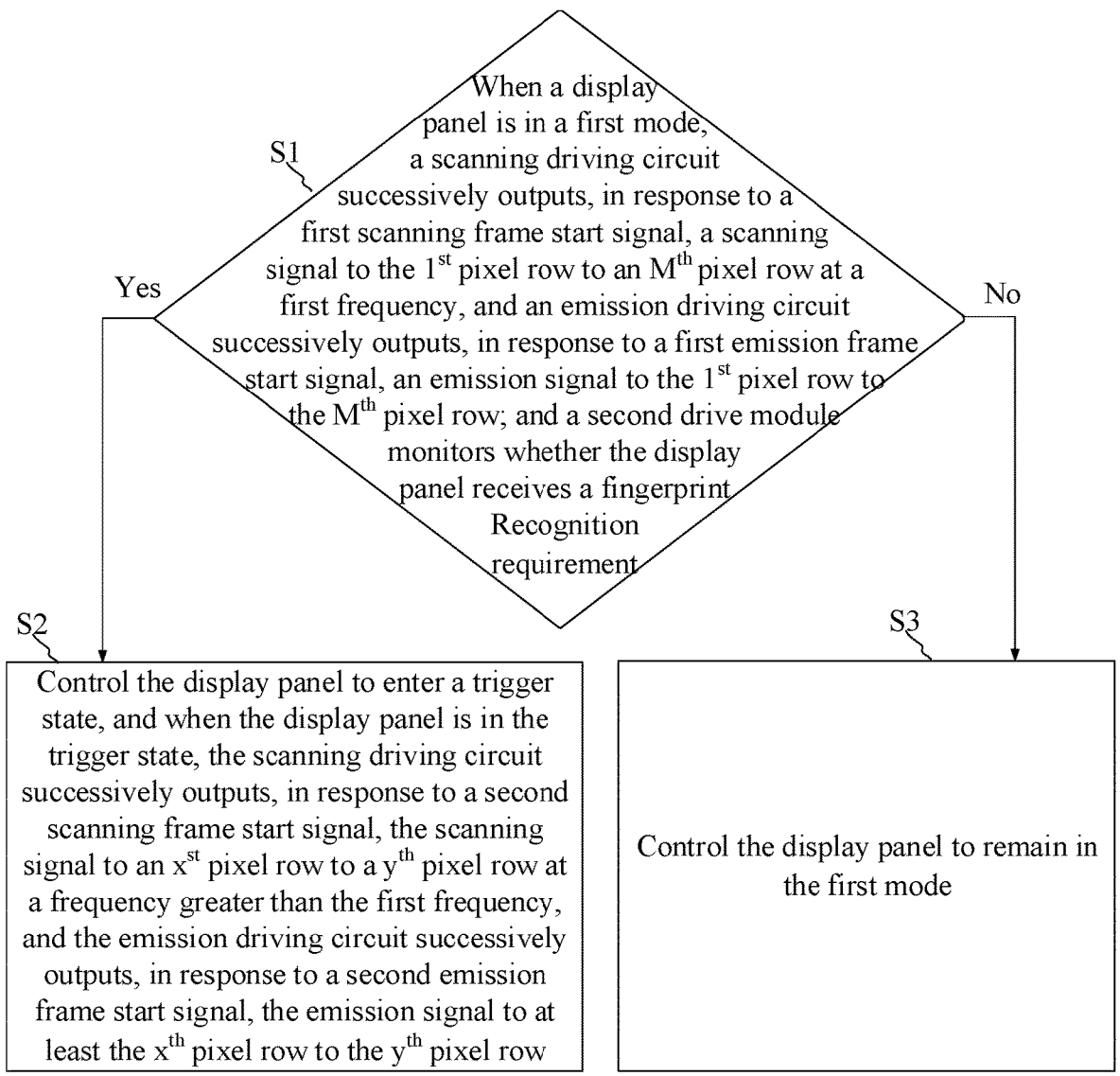
FIG. 14 is yet another flowchart of a method for driving a display panel according to an embodiment of the present disclosure.

Based on the foregoing structure, FIG. 14 illustrates another flowchart of a method for driving a display panel according to an embodiment of the present disclosure. As shown in FIG. 14, when the display panel is in the first mode, the method further includes: successively outputting, by the emission driving circuit 12, in response to a first emission frame start signal, an emission signal to the 1$^{st}$ pixel row 5 to the M$^{th}$ pixel row 5. When the display panel enters the trigger state, the method further includes: successively outputs, by the emission driving circuit 12, in response to a second emission frame start signal, the emission signal to at least the x$^{th}$ pixel row 5 to the y$^{th}$ pixel row 5, to realize normal light-emitting of the subpixel 3.

Figure 15:
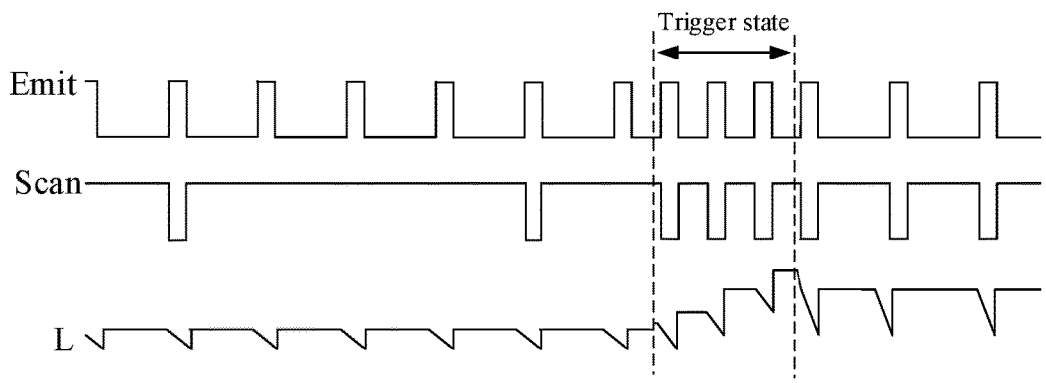
FIG. 15 is another time sequence diagram of a scanning signal and an emission signal according to an embodiment of the present disclosure.

FIG. 15 is another time sequence diagram of a scanning signal and an emission signal according to an embodiment of the present disclosure, where L represents brightness of the fingerprint recognition region 2. As shown in FIG. 15, when the display panel is in the first mode, a frequency at which the emission driving circuit 12 outputs the emission signal Emit can be greater than a frequency at which the scanning driving circuit 6 outputs the scanning signal Scan, which can ensure that the emission driving circuit 12 has a relatively high driving frequency, and avoid occurrence of a flicker phenomenon of a screen. When the display panel enters the trigger state, because a frequency at which the scanning driving circuit 6 scans the first subpixels 4 is relatively high, a frequency at which the emission driving circuit 12 outputs the emission signal Emit may be equal to a frequency at which the scanning driving circuit 6 scans the first subpixels 4.

The following uses two types of structures of the emission driving circuit 12 as an example, to provide two driving manners of the emission driving circuit 12 for description.

First Driving Manner:

Referring to FIG. 13 again, the emission driving circuit 12 can include N1' cascaded first emission shift units 13. The N1' first emission shift units 13 are electrically connected to the M pixel rows 5, and an i'$^{th}$ first emission shift unit 13 is electrically connected to the x$^{th}$ pixel row 5, where N1' is a positive integer greater than 1, and 1≤i'<N1'. The first emission frame start signal line STV21 is electrically connected to the 1$^{st}$ first emission shift unit 13, and the second emission frame start signal line STV22 is electrically connected to the i'$^{th}$ first emission shift unit 13.

A quantity N1' of the first emission shift units 13 and the quantity M of the pixel rows 5 can be the same or be different from each other. FIG. 13 shows an example in which N1'=M. When N1'=M, the N1' cascaded first emission shift units 13 are electrically connected to the M pixel rows 5 in a one-to-one correspondence. In another embodiment of the present disclosure, $$N1' = \frac{M}{2},$$

and in this case, one first emission shift unit 13 is electrically connected to two pixel rows 5.

Figure 16:
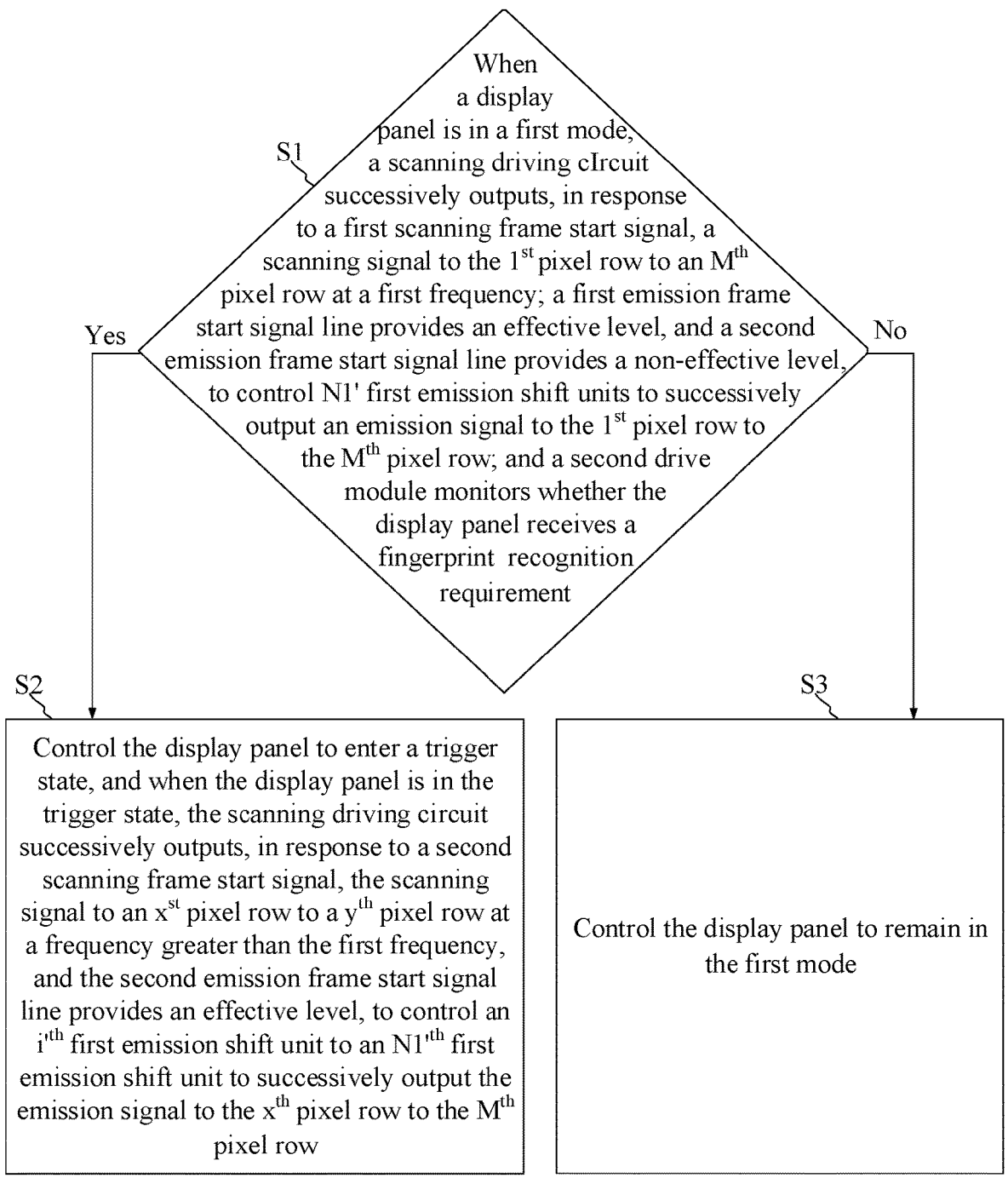
FIG. 16 is yet another flowchart of a method for driving a display panel according to an embodiment of the present disclosure.

Based on the foregoing structure, FIG. 16 illustrates yet another flowchart of a method for driving a display panel according to an embodiment of the present disclosure. As shown in FIG. 16, a process in which the emission driving circuit 12 outputs the emission signal to the 1$^{st}$ pixel row 5 to the M$^{th}$ pixel row 5 can include: providing, by the first emission frame start signal line STV21, an effective level, and providing, by the second emission frame start signal line STV22, a non-effective level, to control the N1' first emission shift units 13 to successively output the emission signal to the 1$^{st}$ pixel row 5 to the M$^{th}$ pixel row 5. A process in which the emission driving circuit 12 outputs the emission signal to at least the x$^{th}$ pixel row to the y$^{th}$ pixel row can include: providing, by the second emission frame start signal line STV22, an effective level, to control the i$^{th}$ first emission shift unit 13 to an N1'$^{th}$ first emission shift unit 13 to successively output the emission signal to the x$^{th}$ pixel row 5 to the M' pixel row 5.

With the foregoing driving manner, a circuit structure of the emission driving circuit 12 does not need to be changed, and only one second emission frame start signal line STV22 connected to the i'$^{th}$ first emission shift unit 13 needs to be additionally provided, so that in the trigger state, the it first emission shift unit 13 to the (N1')$^{th}$ first emission shift unit 13 independently driving the x$^{th}$ pixel row 5 to the M$^{th}$ pixel row 5. This driving manner simplifies a structure design of the emission driving circuit 12, and further avoids a case in which the emission driving circuit 12 occupies a relatively large bezel width in the display panel. This is more conducive to implementation of a narrow bezel design of the display panel.

Figure 17:
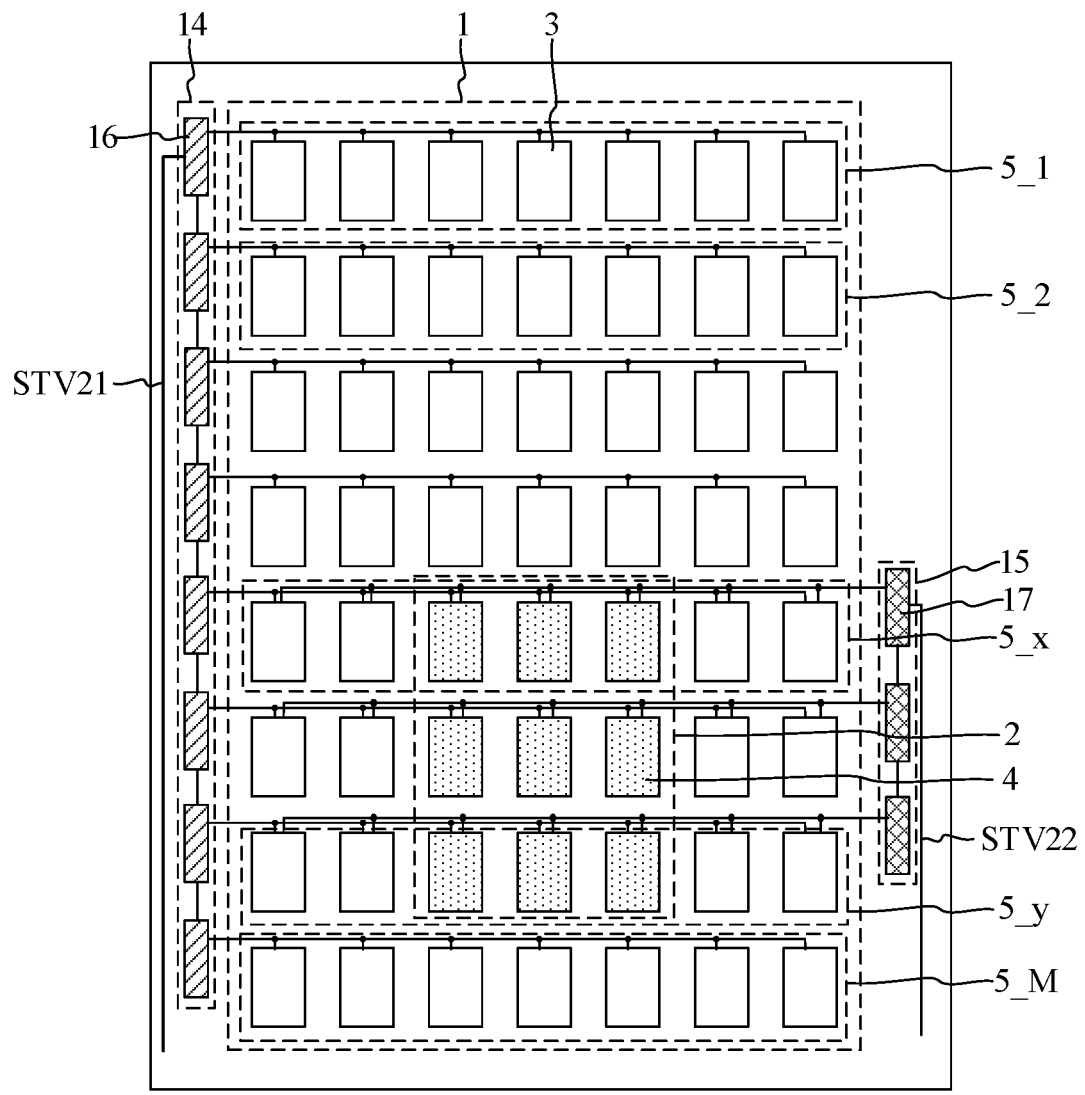
FIG. 17 is another schematic diagram of an emission driving circuit according to an embodiment of the present disclosure.

Second Driving Manner:

FIG. 17 is another schematic diagram of an emission driving circuit 12 according to an embodiment of the present disclosure. As shown in FIG. 17, the emission driving circuit 12 includes a first emission driving circuit 14 and a second emission driving circuit 15. The first emission driving circuit 14 includes N1' cascaded second emission shift units 16. The N1' second emission shift units 16 are electrically connected to the M pixel rows 5, and N1' is a positive integer greater than 1. The second emission driving circuit 15 includes N2' cascaded third emission shift units 17. The N2' third emission shift units 17 are electrically connected to the x$^{th}$ pixel row 5 to the y$^{th}$ pixel row 5, and N2' is a positive integer greater than 1.

The first emission frame start signal line STV21 can be electrically connected to the 1$^{st}$ second emission shift unit 16 in the first emission driving circuit 14, and the second emission frame start signal line STV22 can be electrically connected to the 1$^{st}$ third emission shift unit 17 in the second emission driving circuit 15.

It should be noted that a quantity N1' of the second emission shift units 16 and the quantity M of the pixel rows 5 can be the same or be different from each other, and a quantity N2' of the third emission shift units 17 and the quantity (y−x+1) of the x$^{th}$ pixel row 5 to the y$^{th}$ pixel row 5 can be the same or be different from each other. FIG. 17 shows an example in which N1'=M and N2'=y−x+1. When N1'=M and N2'=y−x+1, the N1' cascaded second emission shift units 16 are electrically connected to the M pixel rows 5 in a one-to-one correspondence, and the N2' cascaded third emission shift units 17 are electrically connected to the x$^{th}$ pixel row 5 to the y$^{th}$ pixel row 5 in a one-to-one correspondence. In another embodiment of the present disclosure, $$N1' = \frac{M}{2} \text{ and } N2' = \frac{y-x+1}{2},$$

and in this case, one second emission shift unit 16 is electrically connected to two pixel rows 5, and one third emission shift unit 17 is also electrically connected to two pixel rows 5.

Figure 18:
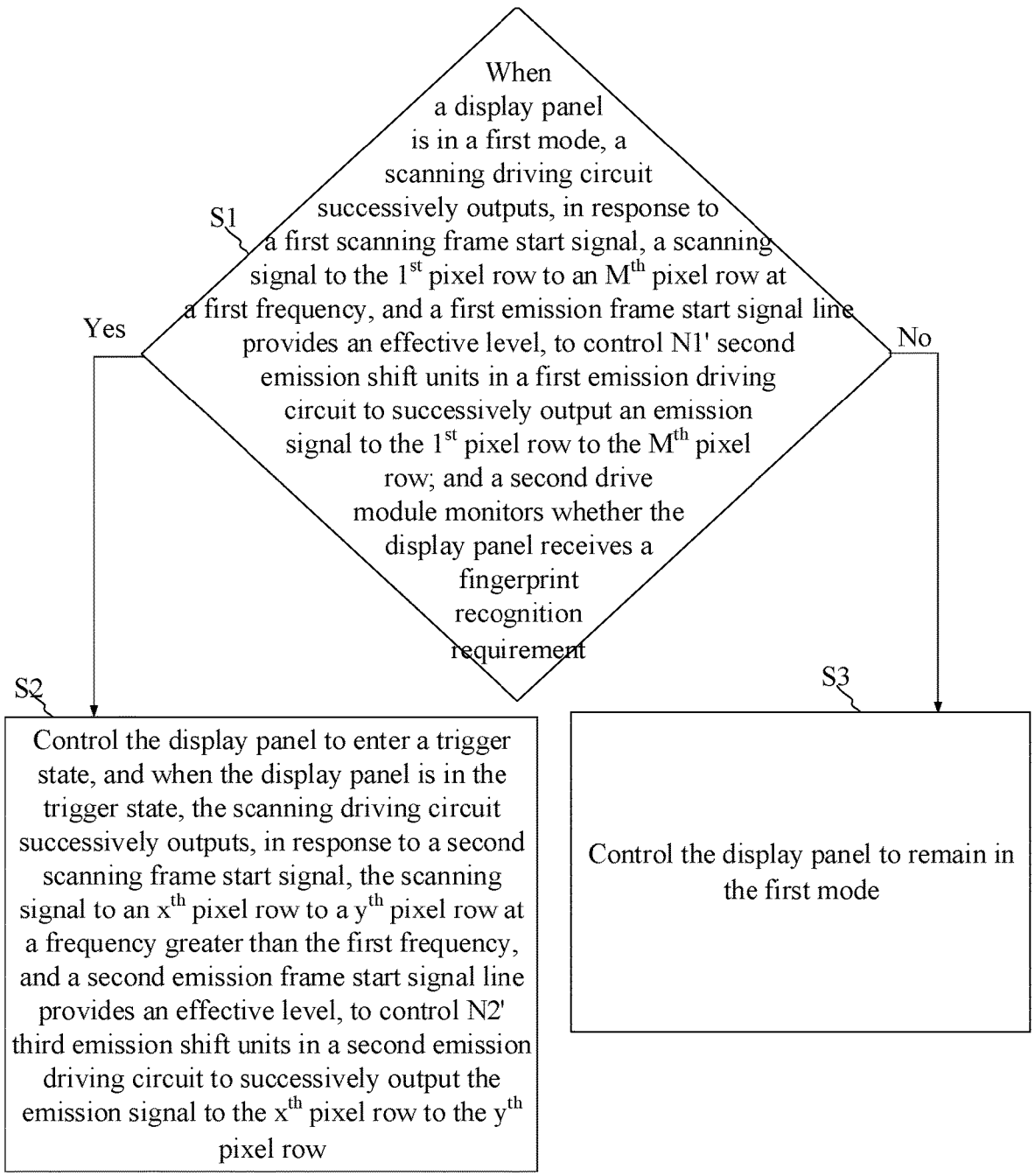
FIG. 18 is yet another flowchart of a method for driving a display panel according to an embodiment of the present disclosure.

Based on the foregoing structure, FIG. 18 illustrates yet another flowchart of a method for driving a display panel according to an embodiment of the present disclosure. As shown in FIG. 18, a process in which the emission driving circuit 12 outputs the emission signal to the $1^{st}$ pixel row 5 to the $M^{th}$ pixel row 5 can include: providing, by the first emission frame start signal line STV21, an effective level, to control the N1' second emission shift units 16 in the first emission driving circuit 14 to successively output the emission signal to the $1^{st}$ pixel row 5 to the $M^{th}$ pixel row 5. A process in which the emission driving circuit 12 outputs the emission signal to at least the $x^{th}$ pixel row to the $y^{th}$ pixel row can include: providing, by the second emission frame start signal line STV22, an effective level, to control the N2' third emission shift units in the second emission driving circuit 15 to successively output the emission signal to the $x^{th}$ pixel row 5 to the $y^{th}$ pixel row.

In the foregoing driving manner, when y<M, in the trigger state, the second emission driving circuit 15 independently drives only pixel rows 5 in which the first subpixels 4 are located, and does not need to drive the last pixel row. The driving manner is more flexible, and further reduces power consumption.

Figure 19:
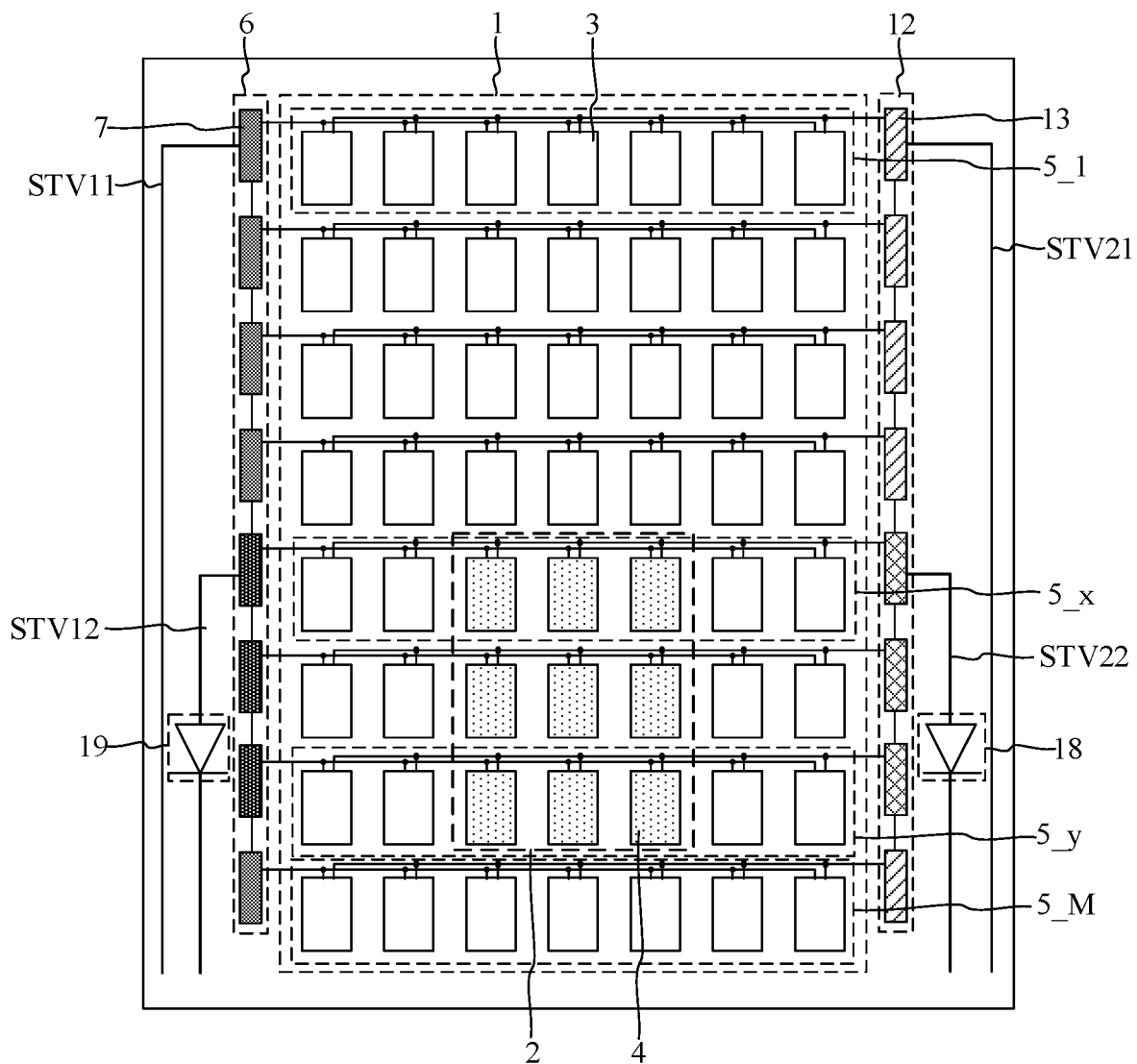
FIG. 19 is a schematic diagram of a second suppression module according to an embodiment of the present disclosure.

FIG. 19 is a schematic diagram a second suppression module 18 according to an embodiment of the present disclosure. In an embodiment, as shown in FIG. 19, the second emission frame start signal line STV22 is connected to the second suppression module 18 in series. In a process in which the emission driving circuit 12 successively outputs, in response to the first emission frame start signal, the emission signal to the $1^{st}$ pixel row 5 to the $M^{th}$ pixel row 5, the second suppression module 18 is configured to suppress signal transmission on the second emission frame start signal line STV22, to avoid a case in which the emission driving circuit 12 is driven by the second emission frame start signal in this process, thereby improving reliability of a working state of the display panel.

Figure 20:
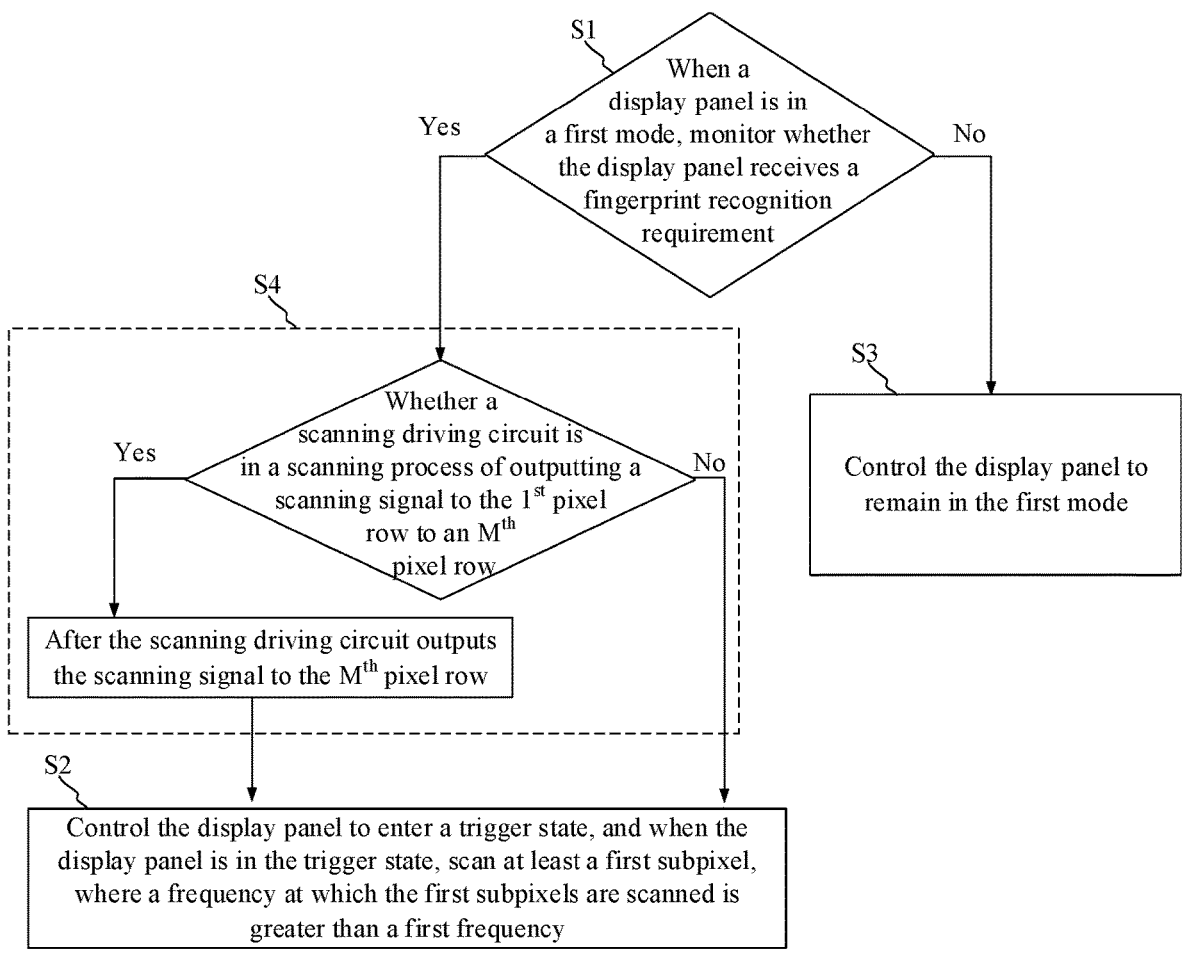
FIG. 20 is yet another flowchart of a method for driving a display panel according to an embodiment of the present disclosure.

FIG. 20 is yet another flowchart of a driving method according to an embodiment of the present disclosure. In an embodiment, as shown in FIG. 20, when it is monitored that the display panel receives a fingerprint recognition requirement, the method for driving the display panel further includes step S4.

At step S4, whether the scanning driving circuit 6 is in a scanning process during which the scanning driving circuit 6 outputs the scanning signal to the $1^{st}$ pixel row 5 to the $M^{th}$ pixel row 5, is determined, and if it is determined that the scanning driving circuit 6 is in the scanning process, the scanning driving circuit 6 are waited for to output the scanning signal to the $M^{th}$ pixel row 5 and then the step S2 is performed; or if it is determined that the scanning driving circuit 6 is not in the scanning process, step S2 is directly performed.

When it is monitored that the display panel receives the fingerprint recognition requirement, in this embodiment of the present disclosure, a scanning status of the scanning driving circuit 6 is determined. The scanning driving circuit 6 enters the trigger state only after outputting the scanning signal to the $M^{th}$ pixel row 5, and triggering can be performed within a holding period in a display time of one frame of image. A scanning process in the first mode and a scanning process in the trigger state are mutually staggered, and in the trigger state, a data line transmits a data signal to only one pixel row 5 of the $x^{th}$ pixel row to the $M^{th}$ pixel row or the $x^{th}$ pixel row to the $y^{th}$ pixel row at a same moment, to improve transmission accuracy of the data signal, thereby avoiding impact, on display and brightness improvement of the display panel, caused by chaotic transmission of the data signal.

Figure 21:
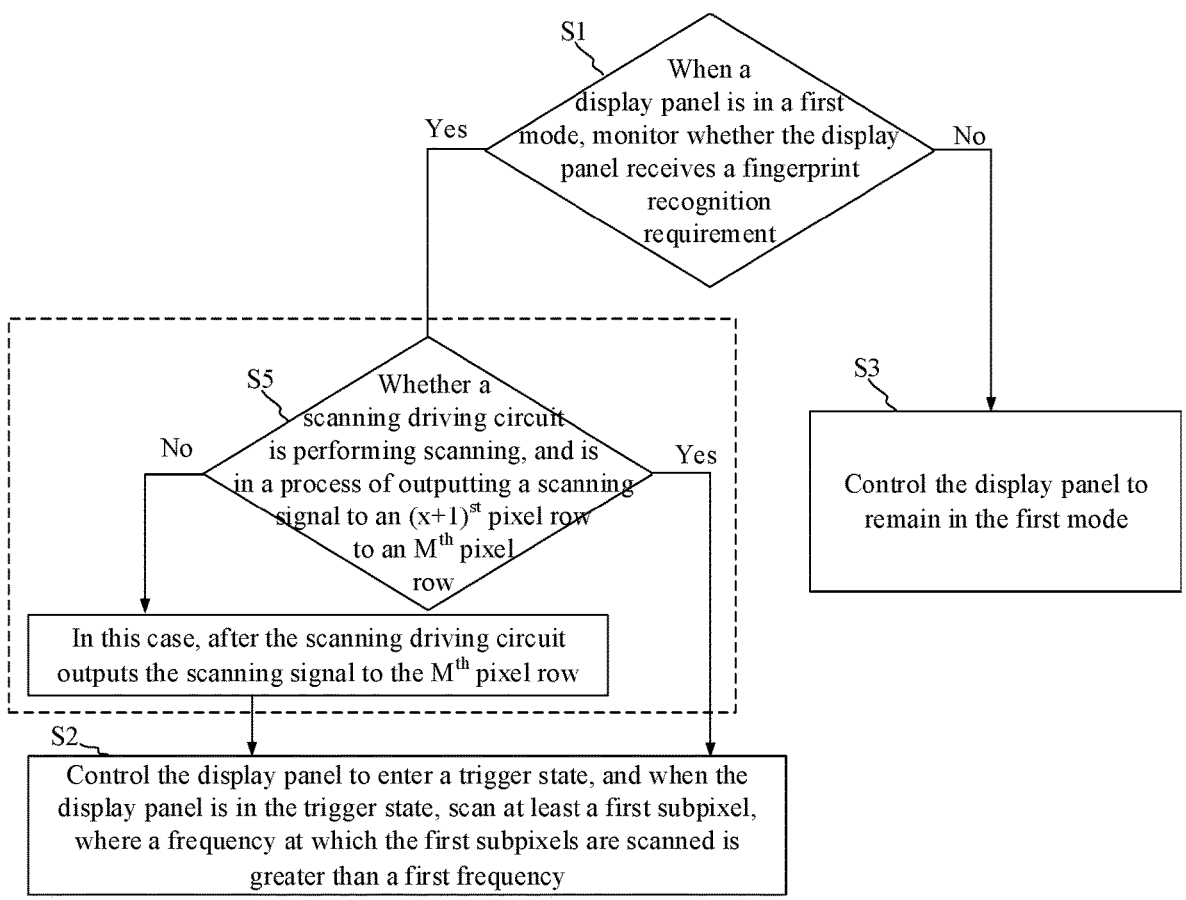
FIG. 21 is yet another flowchart of a method for driving a display panel according to an embodiment of the present disclosure.

FIG. 21 is yet another flowchart of a driving method according to an embodiment of the present disclosure. In another embodiment, as shown in FIG. 21, when it is monitored that the display panel receives the fingerprint recognition requirement, the method further includes step S5.

At step S5, whether the scanning driving circuit 6 is performing scanning and is in a scanning process where the scanning driving circuit 6 outputs the scanning signal to an $(x+1)^{th}$ pixel row 5 to the $M^{th}$ pixel row 5 is determined. If it is determined that the scanning driving circuit 6 is performing scanning and is in the scanning process, step S2 is directly performed, or if it is determined that the scanning driving circuit 6 is not performing scanning or is not in the scanning process, the scanning driving circuit 6 is delayed to output the scanning signal to the $M^{th}$ pixel row 5 and then step S2 is performed.

In the foregoing driving manner, after receiving the fingerprint recognition requirement, the scanning driving circuit 6 can directly enter the trigger state in the scanning process where the scanning driving circuit 6 outputs the scanning signal to the $(x+1)^{th}$ pixel row 5 to the $M^{th}$ pixel row 5, to shorten a time interval between receiving the fingerprint recognition requirement and entering the trigger state, thereby shortening a recognition response time to some extent.

In the foregoing driving manner, scanning in the trigger state is directly performed when scanning in the first mode does not end. Although a case in which the data line simultaneously transmits the data signal to two pixel rows 5 occurs, because the first subpixels 4 in the trigger state are refreshed at a very high rate, the data signal on the data line is also refreshed very quickly, and the data signal transmitted on the data line does not remain at a fixed electric potential for an excessively long time. Therefore, image display and brightness improvement are not severely affected. Compared with that scanning in the trigger state is performed when the scanning driving circuit 6 outputs the scanning signal to the $1^{st}$ pixel row 5 to the $x^{th}$ pixel row 5, in the foregoing driving manner, scanning in the trigger state is performed only after scanning performed by the scanning driving circuit 6 on the $x^{th}$ pixel row 5 ends. A quantity of remaining pixel rows 5 that are not scanned in the scanning process in the first mode is relatively small. Therefore, in the trigger state, there are relatively few cases in which the data line simultaneously transmits the data signal to two pixel rows 5, so that impact of the data signal on image display and brightness improvement is smaller.

One time of scanning process in which the scanning driving circuit 6 successively outputs, in response to the second scanning frame start signal, the scanning signal to at least the $x^{th}$ pixel row 5 to the $y^{th}$ pixel row 5 is one time of high frequency scanning. In an embodiment, the method further includes: pre-storing a quantity n of times of high frequency scanning, where n is a positive integer greater than or equal to 1, for example, n=2 or n=3; and performing n times of high frequency scanning on the first subpixels 4 when the display panel is in the trigger state.

The quantity of times n in which high frequency scanning is preset, so that after entering the trigger state, the display panel directly performs n times of high frequency scanning on the first subpixels 4. In this case, the fingerprint recognition region 2 can achieve a required brightness threshold. There is no need to monitor in real-time, in the trigger state, brightness of the fingerprint recognition region 2, and a driving manner is simpler and more convenient.

In an embodiment, when n>1, in processes of the n times of high frequency scanning, the first subpixels 4 can be scanned at a same frequency. For example, in the n times of high frequency scanning, the first subpixels 4 are refreshed at relatively high frequency of 120 Hz. In this case, a refresh frequency of the fingerprint recognition region 2 is relatively high, and brightness of the fingerprint recognition region 2 can be more quickly improved to the brightness threshold required by fingerprint recognition.

In an embodiment, when n>1, in processes of at least two times of high frequency scanning, the first subpixels 4 are scanned at different frequencies. For example, in the trigger state, scanning can be alternately performed at frequencies of 120 Hz and 100 Hz. In this case, an equivalent refresh frequency of the fingerprint recognition region 2 is slightly lower, so that power consumption is further reduced to some extent while the brightness of the fingerprint recognition region 2 is quickly improved.

In an embodiment, when n>1 and the display panel is in the trigger state, the method further includes: successively outputting, by the scanning driving circuit 6 in response to the first scanning frame start signal, the scanning signal to the $1^{st}$ pixel row 5 to the $M^{th}$ pixel row 5; and after a $k^{th}$ time of high frequency scanning ends, determining whether the scanning driving circuit 6 is in a scanning process where the scanning driving circuit 6 outputs the scanning signal to the $1^{st}$ pixel row 5 to the $M^{th}$ pixel row 5, and if it is determined that the scanning driving circuit 6 is in the scanning process, waiting for the scanning driving circuit 6 to output the scanning signal to the $M^{th}$ pixel row 5 and then performing a $(k+1)^{th}$ time of high frequency scanning, or if it is determined that the scanning driving circuit 6 is not in the scanning process, directly performing a $(k+1)^{th}$ time of high frequency scanning, where k=1, . . . , and n−1.

When the display panel is in the trigger state, the scanning driving circuit 6 is enabled to simultaneously scan the $1^{st}$ pixel row 5 to the $M^{th}$ pixel row 5, to enable the display region 1 to still maintain normal display of an image. For example, when the display panel displays an image, the display panel enters the trigger state, and when performing high frequency scanning on the first subpixels 4 in the fingerprint recognition region 2, the scanning driving circuit 6 can still perform synchronous scanning on the M pixel rows 5 in the display region 1. Therefore, in a trigger period, the display panel can still continue to display the image. Each time after high frequency scanning ends, a scanning status of the scanning driving circuit 6 is determined, and the scanning driving circuit 6 performs next time of high frequency scanning only after outputting the scanning signal to the $M^{th}$ pixel row 5, which improves accuracy of a data signal wrote to a pixel row, and avoids impact, on display and brightness improvement of the display panel, caused by chaotic transmission of the data signal.

In another embodiment, when n>1 and the display panel is in the trigger state, the method further includes: successively outputting, by the scanning driving circuit 6 in response to the first scanning frame start signal, the scanning signal to the $1^{st}$ pixel row 5 to the $M^{th}$ pixel row 5; and after a $k^{th}$ time of high frequency scanning ends, determining whether the scanning driving circuit 6 is performing scanning and is in a scanning process where the scanning driving circuit 6 outputs the scanning signal to an $(x+1)^{th}$ pixel row 5 to the $M^{th}$ pixel row 5, and if it is determined that the scanning driving circuit 6 is performing scanning and is in the scanning process, directly performing a $(k+1)^{th}$ time of high frequency scanning, or if it is determined that the scanning driving circuit 6 is not performing scanning or is not in the scanning process, waiting for the scanning driving circuit 6 to output the scanning signal to the $M^{th}$ pixel row 5 and performing a $(k+1)^{th}$ time of high frequency scanning, where k=1, . . . , and n−1.

In this driving manner, after the $k^{th}$ time of high frequency scanning ends, in a scanning process in which the scanning driving circuit 6 outputs the scanning signal to the $(x+1)^{th}$ pixel row 5 to the $M^{th}$ pixel row 5, the $(k+1)^{th}$ time of high frequency scanning can be directly performed, so that a time interval between the $k^{th}$ time of high frequency scanning and the $(k+1)^{th}$ time of high frequency scanning is shortened. Therefore, a time length required by improvement of brightness of the first subpixels 4 is shortened, and a recognition response time is reduced.

In an embodiment, when the display panel is in the first mode, for example, a standby mode or a static image display mode, to effectively reduce power consumption, the first frequency f1 can satisfy f1≤60 Hz, and for example, the first frequency f1 can be 60 Hz, 30 Hz, 15 Hz, 1 Hz, or the like. When the display panel is in the second mode, for example, a dynamic image display mode, to improve a display effect, the second frequency f2 can satisfy 60 Hz<f2≤$f_{max}$, and for example, the second frequency f2 can be 90 Hz, 120 Hz, or the like, where $f_{max}$ is a maximum scanning frequency of the display panel, and for example, $f_{max}$=120 Hz.

When the display panel is in the trigger state, a frequency at which the first subpixels 4 are scanned is f3, and it can be set that f3=$f_{max}$, so that after entering the trigger state, the first subpixels 4 are scanned at a maximum scanning frequency that can be achieved by the display panel, which improves a refresh rate of the fingerprint recognition region 2, thereby improving the brightness of the fingerprint recognition region 2 more quickly.

In an embodiment, the method further includes: after the display panel enters the trigger state, controlling the display panel to enter a fingerprint recognition state, where a start moment of the fingerprint recognition state is later than a start moment of the trigger state. Therefore, enough brightness improvement time for the fingerprint recognition region 2 is reserved, and when fingerprint recognition is performed, light rays, with enough brightness, incident to a finger in the fingerprint recognition region 2 are ensured, so that a fingerprint image acquired by a fingerprint recognition module is clearer, and recognition precision is higher.

In an embodiment, the method further includes: after the trigger state ends, controlling the display panel to enter the fingerprint recognition state, thereby ensuring that the fingerprint recognition region 2 has enough brightness during fingerprint recognition.

Figure 22:
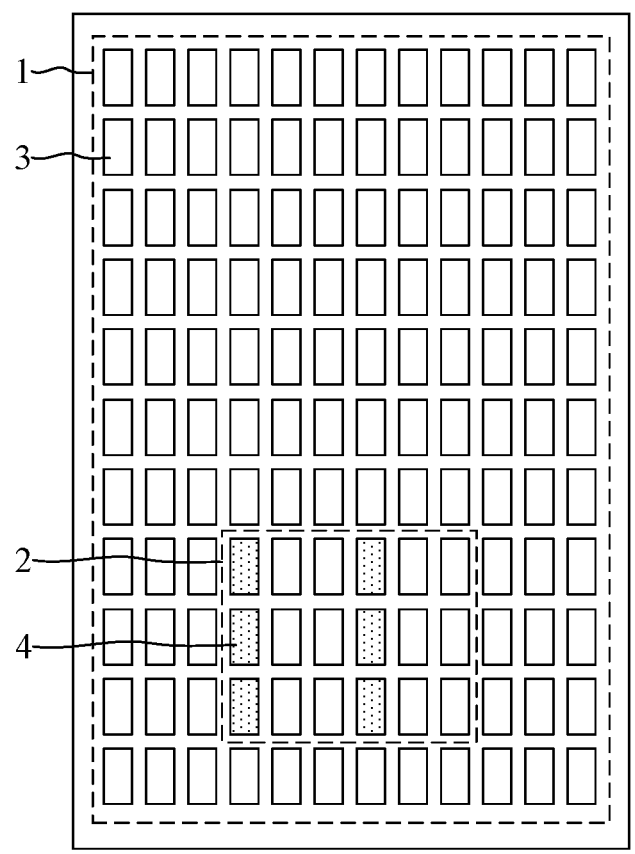
FIG. 22 is another schematic diagram of a display panel according to an embodiment of the present disclosure.

Referring to FIG. 2 again, all subpixels 3 in the fingerprint recognition region 2 can be used as a light source for fingerprint recognition, that is, all the subpixels 3 in the fingerprint recognition region 2 are first subpixels 4. FIG. 22 is another schematic diagram of a display panel according to an embodiment of the present disclosure. In another embodiment, as shown in FIG. 22, only some of the subpixels 3 in the fingerprint recognition region 2 are used as a light source for fingerprint recognition. Because the finger has relatively high absorption and reflectivity of green light, and the fingerprint recognition module also has a relatively high identification capability of the green light, in this embodiment of the present disclosure, green subpixels in the fingerprint recognition region 2 may be used as a fingerprint recognition light source. In addition, in the fingerprint recognition state, the green subpixels may be controlled to display highest brightness, for example, display brightness corresponding to 255 grayscale, to ensure that the fingerprint recognition region 2 emits a sufficient quantity of light rays towards the finger.

In an embodiment, when the display panel is in the fingerprint recognition state, a frequency at which the subpixels 3 are scanned can be equal to the first frequency. In this case, a refresh frequency of the subpixels 3 is relatively low, which can reduce power consumption. In an embodiment, a frequency at which the subpixels 3 are scanned can be equal to the second frequency. In this case, a refresh frequency of the first subpixels 4 is relatively high, and brightness of the fingerprint recognition region 2 is higher, so that there are more light rays incident to the finger. In an embodiment, to implement both low power consumption and high brightness, when the display panel is in the fingerprint recognition state, a frequency at which the subpixels 3 are scanned can be greater than the first frequency and smaller than the second frequency.

In an embodiment, a data voltage received by the first subpixel 4 in the trigger state is smaller than a data voltage received by the first subpixel 4 in the fingerprint recognition state.

With reference to the analysis of a working principle of the pixel circuit shown in FIG. 11, in the light-emitting period t3, it can be learned, according to a current formula, that a current I flowing to the organic light-emitting diode D is inversely proportional to the data voltage $V_{Data}$. A higher data voltage $V_{Data}$ indicates a smaller current I flowing to the organic light-emitting diode D, and light-emitting brightness of the subpixel 3 is lower. A smaller data voltage $V_{Data}$ indicates a higher current I flowing to the organic light-emitting diode D, and light-emitting brightness of the subpixel 3 is higher.

In the fingerprint recognition state, it is assumed that light-emitting brightness of the first subpixels 4 is L1, and a data voltage corresponding to the light-emitting brightness L1 is $V_{Data}1$. In the foregoing driving manner, in the trigger state, a data voltage $V_{Data}2$ smaller than the data voltage $V_{Data}1$ is provided for the first subpixels 4, so that the first subpixels 4 can be driven to emit light at the light-emitting brightness L2 higher than L1, which can enable brightness of the first subpixels 4 to be more quickly improved to brightness required by fingerprint recognition.

In an embodiment, in a process of the trigger state, a data voltage received by each first subpixel 4 remains unchanged, so that the first subpixel 4 always maintains relatively high light-emitting brightness, and the brightness of the fingerprint recognition region 2 is improved at a higher rate.

In an embodiment, one time of scanning process in which the scanning driving circuit 6 successively outputs, in response to the second scanning frame start signal, the scanning signal to at least the $x^{th}$ pixel row 5 to the $y^{th}$ pixel row 5 is one time of high frequency scanning. When the display panel is in the trigger state, n times of high frequency scanning are performed on the first subpixels 4, where n is a positive integer greater than or equal to 1. A data voltage received by the first subpixel 4 in the $k^{th}$ time of high frequency scanning is greater than a data voltage received by the first subpixel 4 in the $(k+1)^{th}$ time of high frequency scanning, where k=1, 2, . . . , and n−1, to enable light-emitting brightness of the first subpixel 4 in the $(k+1)^{th}$ time of high frequency scanning to be greater than light-emitting brightness of the first subpixel 4 in the $k^{th}$ time of high frequency scanning, which realizes gradual brightness improvement of the first subpixels 4, achieving both a relatively high brightness improvement rate and relatively low power consumption.

In the trigger state, based on an image to be displayed by the fingerprint recognition region 2, data voltages received by different first subpixels 4 can be the same or be different from each other. For example, when receiving the fingerprint recognition requirement, the fingerprint recognition region 2 can display an identifier of one fingerprint, used to provide, for a user, a prompt indicating that recognition is to be performed on the fingerprint. In this case, light-emitting brightness of different first subpixels 4 are different. Therefore, received data voltages are also different.

Figure 23:
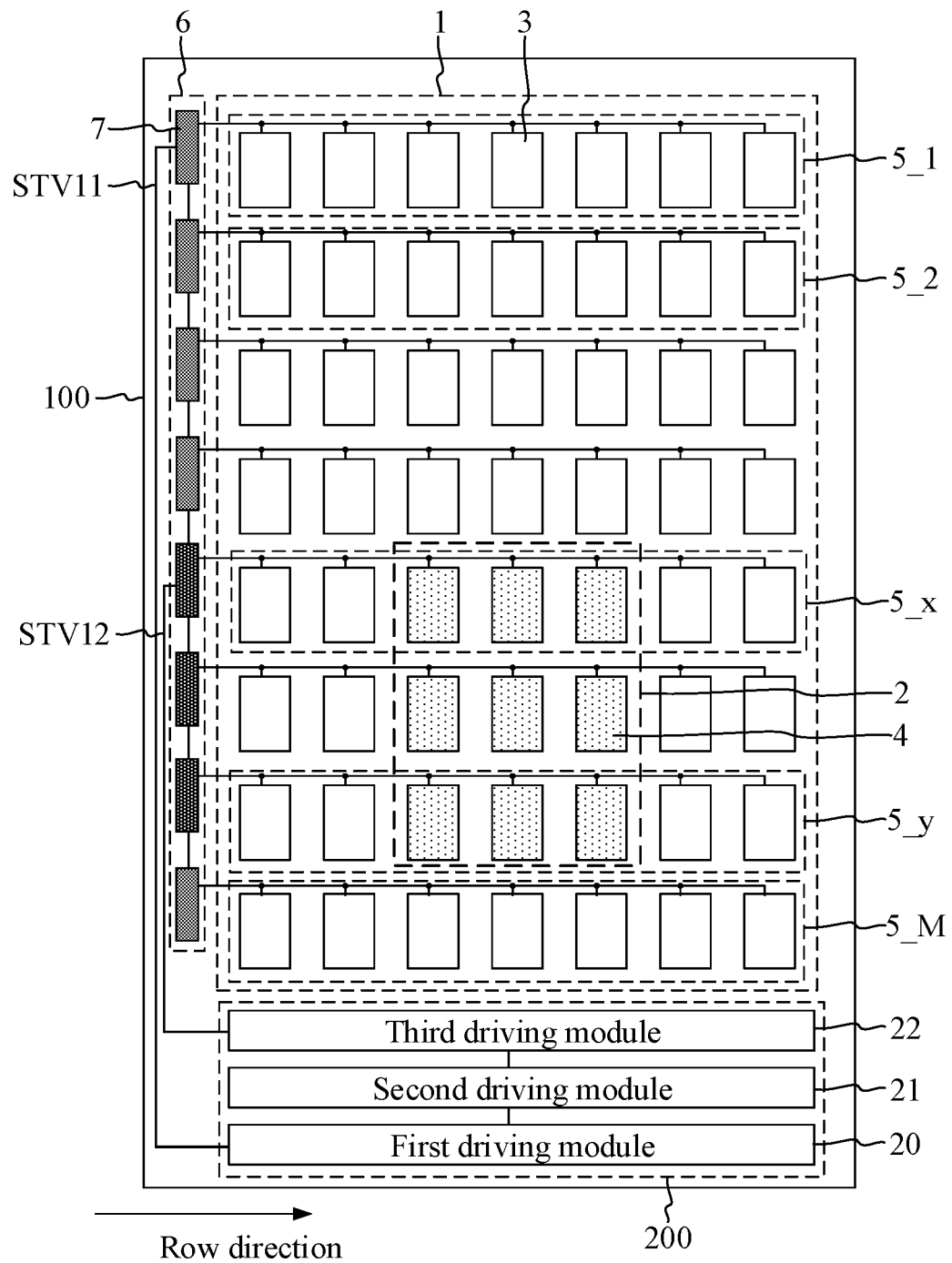
FIG. 23 is a schematic diagram of a display apparatus according to an embodiment of the present disclosure.

Based on a same inventive concept, an embodiment of the present disclosure further provides a display apparatus. FIG. 23 is a schematic diagram of a display apparatus according to an embodiment of the present disclosure. As shown in FIG. 23, the display apparatus includes a display panel 100. The display panel 100 has a display region 1 including a fingerprint recognition region 2, and includes a plurality of subpixels 3 located in the display region 1. The subpixels include a plurality of first subpixels 4 located in the fingerprint recognition region 2 and used as a light source for fingerprint recognition.

The display apparatus further includes a driving chip 200. The driving chip 200 includes a first driving module 20, a second driving module 21, and a third driving module 22. The first driving module 20 is configured to control the display panel 100 to be in a first mode, to enable the display panel 100 to scan the subpixel 3 at a first frequency, or control the display panel 100 to be in a second mode, to enable the display panel 100 to scan the subpixel 3 at a second frequency, where the second frequency is greater than the first frequency. The second driving module 21 is electrically connected to the first driving module 20, and is configured to: when the display panel 100 is in the first mode, monitor whether the display panel 100 receives a fingerprint recognition requirement, and, if yes, transmit a trigger instruction. The third driving module 22 is electrically connected to the second driving module 21, and is configured to: when receiving the trigger instruction, control the display panel 100 to be in a trigger state, to enable the display panel 100 to scan at least the first subpixels 4, where a frequency at which the first subpixels 4 are scanned is greater than the first frequency.

With the foregoing driving structure, when the display panel is in the first mode in which scanning is performed at a relatively low frequency, if the display panel receives the fingerprint recognition requirement, the display panel scans the first subpixels 4 in the fingerprint recognition region 2 at a frequency greater than the first frequency, so that a refresh frequency of the first subpixels 4 in the fingerprint recognition region 2 can be increased, and after being charged, the first subpixels 4 can be charged for a second time within a display time of a next frame of image with only a relatively short pause time, thereby quickly improving brightness of the first subpixels 4.

In this embodiment of the present disclosure, after the display panel receives the fingerprint recognition requirement, a process of quickly improving the brightness of the first subpixels 4 is added, which not only shortens a fingerprint recognition response time and enhances user experience, but also quickly improves overall brightness of the fingerprint recognition region 2. In subsequent fingerprint recognition, more light is incident to a finger from the fingerprint recognition region 2, and a fingerprint image acquired by a fingerprint recognition module is clearer, so that recognition precision of the fingerprint is higher.

In an embodiment, referring to FIG. 23 again, the display panel 100 further includes M pixel rows 5 (for clear description, in FIG. 23, a reference sign of an $a^{th}$ pixel row 5 is represented by 5_$a$, where a value of a is 1, . . . , and M) and a scanning driving circuit 6. Each pixel row 5 includes a plurality of subpixels 3 arranged along a row direction, the first subpixels 4 are located in an $x^{th}$ pixel row 5 to a $y^{th}$ pixel row 5, where 1≤x<y≤M, and M is a positive integer greater than 1; and the scanning driving circuit 6 is electrically connected to a first scanning frame start signal line STV11, a second scanning frame start signal line STV12, and the M pixel rows 5.

The first driving module 20 is further configured to: when the display panel 100 is in the first mode, control the first scanning frame start signal line STV11 to output a first scanning frame start signal, to enable the scanning driving circuit 6 to successively output a scanning signal to the $1^{st}$ pixel row 5 to an $M^{th}$ pixel row 5. The third driving module 22 is further configured to: under control of the trigger instruction, control the second scanning frame start signal line STV12 to output a second scanning frame start signal, to enable the scanning driving circuit 6 to successively output the scanning signal to at least the $x^{th}$ pixel row 5 to the $y^{th}$ pixel row 5, to improve a refresh frequency of the first subpixels 4 in the $x^{th}$ pixel row 5 to the $y^{th}$ pixel row 5, to enable brightness of the first subpixels 4 to be quickly improved to a brightness threshold required by fingerprint recognition.

Referring to FIG. 5 again, the scanning driving circuit 6 can includes N1 cascaded first scanning shift units 7. The N1 first scanning shift units 7 are electrically connected to the M pixel rows 5, and an $i^{th}$ first scanning shift unit 7 is electrically connected to the $x^{th}$ pixel row 5, where N1 is a positive integer greater than 1, and 1≤i<N1. The first scanning frame start signal line STV11 is electrically connected to the $1^{st}$ first scanning shift unit 7, and the second scanning frame start signal line STV12 is electrically connected to the $i^{th}$ first scanning shift unit 7.

A relationship between N1 and M has been described in the foregoing embodiments, which will not be repeated herein.

In the foregoing setting manner, in one aspect, a circuit structure of the scanning driving circuit 6 does not need to be changed, and only one second scanning frame start signal line STV12 connected to the $i^{th}$ first scanning shift unit 7 needs to be additionally provided, so that in the trigger state, the $i^{th}$ first scanning shift unit 7 to the $(N1)^{th}$ first scanning shift unit 7 independently scan the $x^{th}$ pixel row 5 to the $M^{th}$ pixel row 5. This driving manner simplifies a structure design of the scanning driving circuit 6, and further avoids a case in which the scanning driving circuit 6 occupies a relatively large bezel width in the display panel 100. This is more conducive to implementation of a narrow bezel design of the display panel 100. In another aspect, in the trigger state, in the foregoing driving manner, only the $x^{th}$ pixel row 5 to the $M^{th}$ pixel row 5 are scanned at a relatively high frequency. Compared with a case in which an entire screen is switched to high frequency scanning, this reduces power consumption, and further shortens a brightness improvement time of the fingerprint recognition region 2.

In an embodiment, referring to FIG. 8 again, the scanning driving circuit 6 includes a first scanning driving circuit 8 and a second scanning driving circuit 9. The first scanning driving circuit 8 includes N1 cascaded second scanning shift units 10. The N1 second scanning shift units 10 are electrically connected to the M pixel rows 5, and N1 is a positive integer greater than 1. The second scanning driving circuit 9 includes N2 cascaded third scanning shift units 11. The N2 third scanning shift units 11 are electrically connected to the $x^{th}$ pixel row 5 to the $y^{th}$ pixel row 5, and N2 is a positive integer greater than 1.

The first scanning frame start signal line STV11 is electrically connected to the $1^{st}$ second scanning shift unit 10 in the first scanning driving circuit 8, and the second scanning frame start signal line STV12 is electrically connected to the $1^{st}$ third scanning shift unit 11 in the second scanning driving circuit 9.

A relationship between N1, N2, and M has been described in the foregoing embodiments, which will not be repeated herein.

With the foregoing configuration, the second scanning driving circuit 9 can independently scan the $x^{th}$ pixel row 5 to the $y^{th}$ pixel row 5, and a scanning manner is more flexible. Particularly, when y<M, in the trigger state, the display panel needs to perform high frequency scanning only on the $x^{th}$ pixel row 5 to the $y^{th}$ pixel row 5, and does not need to scan the $y^{th}$ pixel row 5 to the $M^{th}$ pixel row 5, which reduces power consumption and shortens a brightness improvement time of the fingerprint recognition region 2.

In the foregoing setting manner, in the trigger state, because high frequency scanning needs to be performed only on pixel rows 5 in which the first subpixels 4 are located, and the last pixel row does not need to be scanned, a limitation on a setting position of the fingerprint recognition region 2 is relatively small, and the fingerprint recognition region 2 is not limited to be set on a bottom portion of the display region 1. Even if the fingerprint recognition region 2 is set on a top portion or in the middle of the display region 1, a brightness improvement time is not affected. This improves flexibility of the setting position of the fingerprint recognition region 2.

In an embodiment, referring to FIG. 8 again, the first scanning driving circuit 8 and the second scanning driving circuit 9 can be located at two opposite sides of the display region 1, respectively, to improve symmetry of bezel widths of the display panel 100.

In an embodiment, referring to FIG. 10 again, the second scanning frame start signal line STV12 is connected to the first suppression module 19 in series. In a process in which the scanning driving circuit 6 successively outputs, in response to the first scanning frame start signal, the scanning signal to the $1^{st}$ pixel row 5 to the $M^{th}$ pixel row 5, the first suppression module 19 is configured to suppress signal transmission on the second scanning frame start signal line STV12, to avoid a case in which the scanning driving circuit 6 is driven by the second scanning frame start signal in this process, thereby improving reliability of a working state of the display panel 100.

In an embodiment, the first suppression module 19 can include at least one diode. In the process in which the scanning driving circuit 6 successively outputs, in response to the first scanning frame start signal, the scanning signal to the $1^{st}$ pixel row 5 to the $M^{th}$ pixel row 5, the diode is in a high resistance state, to suppress the signal transmission on the second scanning frame start signal line STV12. However, in the process in which the scanning driving circuit 6 successively outputs, in response to the second scanning frame start signal, the scanning signal to at least the $x^{th}$ pixel row 5 to the $y^{th}$ pixel row 5, the diode is in a conductive state, to ensure that the scanning driving circuit 6 performs high frequency scanning on the first subpixels 4 under driven of the second scanning frame start signal.

Figure 24:
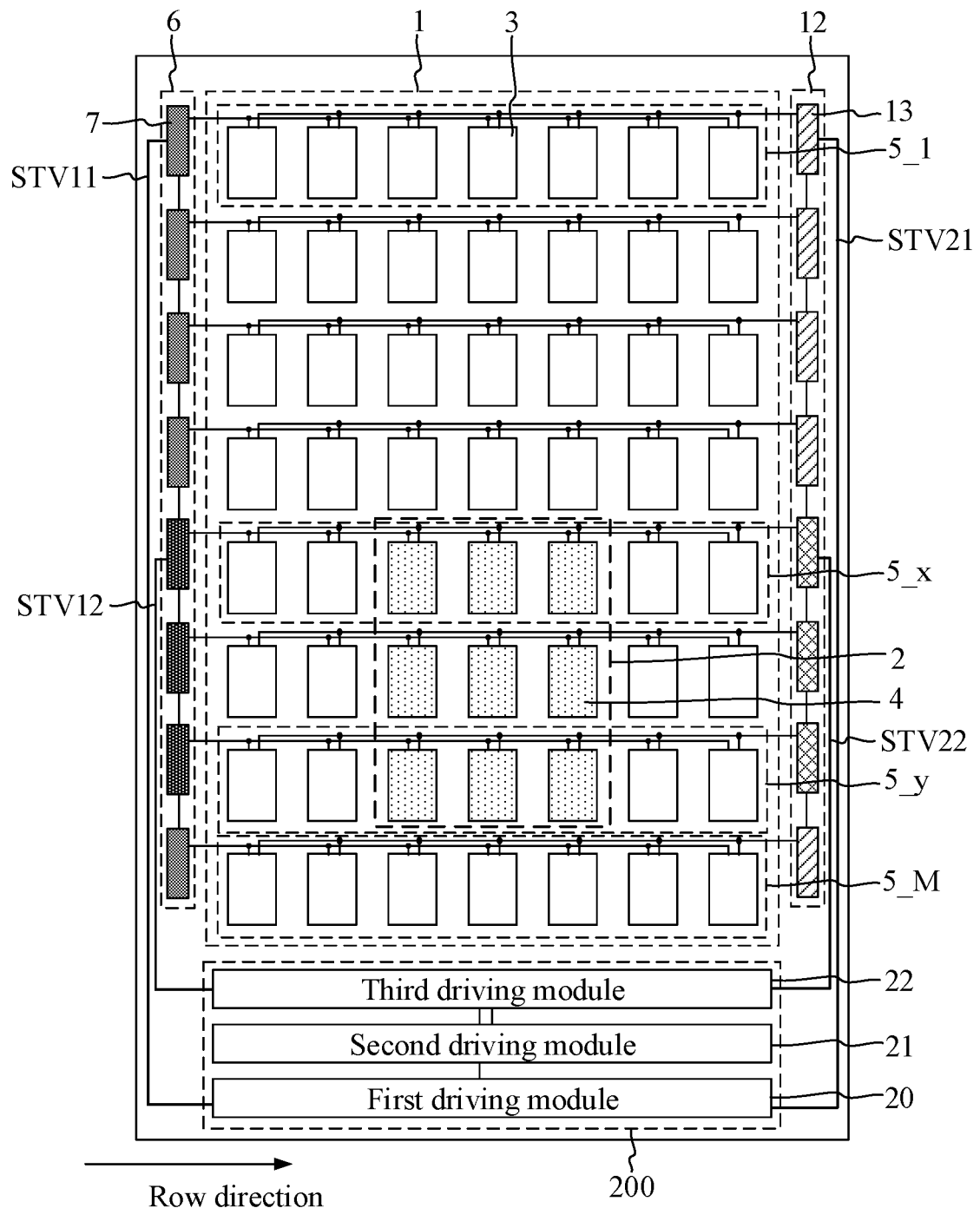
FIG. 24 is another schematic diagram of a display apparatus according to an embodiment of the present disclosure.

FIG. 24 is another schematic diagram of a display apparatus according to an embodiment of the present disclosure. In an embodiment, as shown in FIG. 24, the display panel 100 further includes an emission driving circuit 12, and the emission driving circuit 12 is electrically connected to a first emission frame start signal line STV21, a second emission frame start signal line STV22, and the M pixel rows 5.

The first driving module 20 is further configured to: when the display panel 100 is in the first mode, control the first emission frame start signal line STV21 to output a first emission frame start signal, to enable the emission driving circuit 12 to successively output an emission signal to the $1^{st}$ pixel row 5 to the $M^{th}$ pixel row 5. The third driving module 22 is further configured to: under control of the trigger instruction, control the second emission frame start signal line STV22 to output a second emission frame start signal, to enable the emission driving circuit 12 to successively output the emission signal to at least the $x^{th}$ pixel row 5 to the $y^{th}$ pixel row 5, thereby implementing normal light-emitting of the subpixel 3.

In an embodiment, referring to FIG. 13 again, the emission driving circuit 12 includes N1' cascaded first emission shift units 13. The N1' first emission shift units 13 are electrically connected to the M pixel rows 5, and an $i'^{th}$ first emission shift unit 13 is electrically connected to the $x^{th}$ pixel row 5, where N1' is a positive integer greater than 1, and 1≤i'<N1'. The first emission frame start signal line STV21 is electrically connected to the $1^{st}$ first emission shift unit 13, and the second emission frame start signal line STV22 is electrically connected to the $i'^{th}$ first emission shift unit 13.

A relationship of N1' and M has been described in the foregoing embodiments, which will not be repeated herein.

With such configuration, a circuit structure of the emission driving circuit 12 does not need to be changed, and only one second emission frame start signal line STV22 connected to the $i'^{th}$ first emission shift unit 13 needs to be additionally provided, so that in the trigger state, the $i'^{th}$ first emission shift unit 13 to the $(N1)^{th}$ first emission shift unit 13 independently driving the $x^{th}$ pixel row 5 to the $M^{th}$ pixel row 5. This driving manner simplifies a structure design of the emission driving circuit 12, and further avoids a case in which the emission driving circuit 12 occupies a relatively large bezel width in the display panel 100. This is more conducive to implementation of a narrow bezel design of the display panel 100.

In an embodiment, referring to FIG. 17 again, the emission driving circuit 12 includes a first emission driving circuit 14 and a second emission driving circuit 15. The first scanning driving circuit 14 includes N1' cascaded second emission shift units 16. The N1' second emission shift units 16 are electrically connected to the M pixel rows 5, and N1' is a positive integer greater than 1. The second emission driving circuit 15 includes N2' cascaded third emission shift units 17. The N2' third emission shift units 17 are electrically connected to the $x^{th}$ pixel row 5 to the $y^{th}$ pixel row 5, and N2' is a positive integer greater than 1.

The first emission frame start signal line STV21 is electrically connected to the $1^{st}$ second emission shift unit 16 in the first emission driving circuit 14, and the second emission frame start signal line STV22 is electrically connected to the $1^{st}$ third emission shift unit 17 in the second emission driving circuit 15.

A relationship of N1' and N2' has been described in the foregoing embodiments, which will not be repeated herein.

With such structure, when y<M, in the trigger state, the second emission driving circuit 15 needs to independently drive only pixel rows 5 in which the first subpixels 4 are located, and does not need to drive the last pixel row. The driving manner is more flexible, and reduces power consumption.

In an embodiment, referring to FIG. 19 again, the second emission frame start signal line STV22 is connected to the second suppression module 18 in series. In a process in which the emission driving circuit 12 successively outputs, in response to the first emission frame start signal, the emission signal to the $1^{st}$ pixel row 5 to the $M^{th}$ pixel row 5, the second suppression module 18 is configured to suppress signal transmission on the second emission frame start signal line STV22, to avoid a case in which the emission driving circuit 12 is driven by the second emission frame start signal in this process, thereby improving reliability of a working state of the display panel 100.

In an embodiment, the second suppression module 18 may include at least one diode. In the process in which the emission driving circuit 12 successively outputs, in response to the first emission frame start signal, the emission signal to the $1^{st}$ pixel row 5 to the $M^{th}$ pixel row 5, the diode is in a high resistance state, to suppress the signal transmission on the second emission frame start signal line STV22. However, in the process in which the emission driving circuit 12 successively outputs, in response to the second emission frame start signal, the emission signal to at least the $x^{th}$ pixel row 5 to the $y^{th}$ pixel row 5, the diode is in a conductive state, to ensure that the emission driving circuit 12 is driven by the second scanning frame start signal to driving the first subpixels 4.

Figure 25:
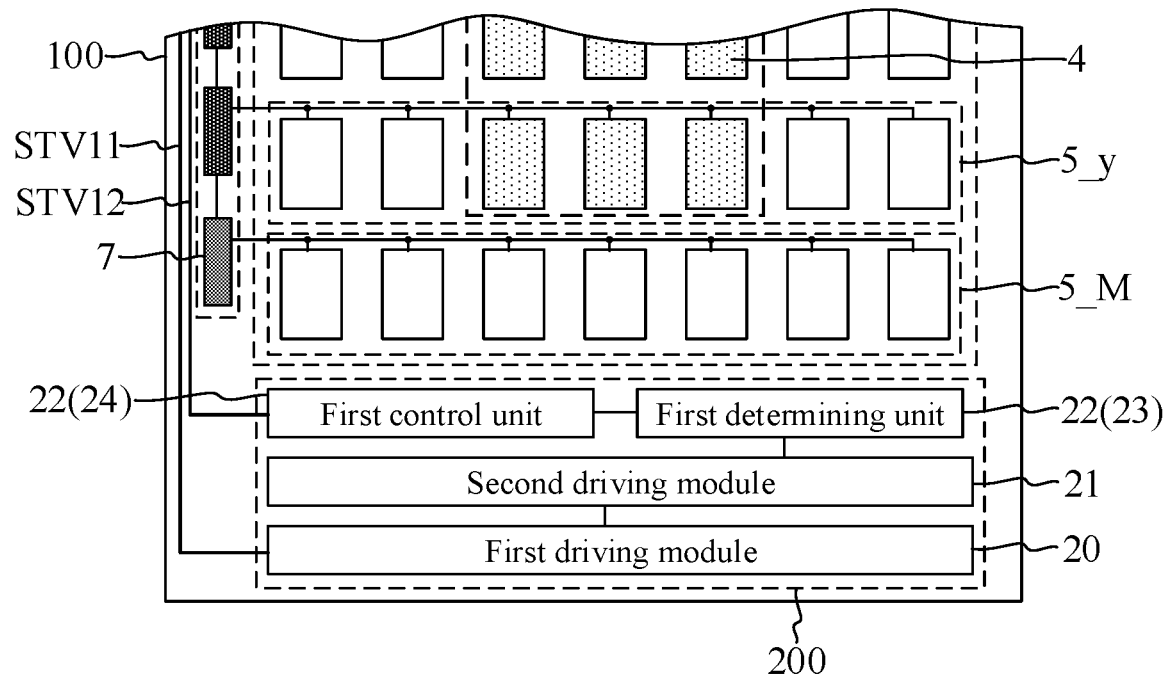
FIG. 25 is still another schematic diagram of a display apparatus according to an embodiment of the present disclosure.

FIG. 25 is still another schematic diagram of a display apparatus according to an embodiment of the present disclosure. In an embodiment, as shown in FIG. 25, the third driving module 22 includes a first determining unit 23 and a first control unit 24. The first determining unit 23 is electrically connected to the second driving module 21, and is configured to: when receiving the trigger instruction, determine whether the scanning driving circuit 6 is in the scanning process during which the scanning driving circuit 6 outputs the scanning signal to the $1^{st}$ pixel row 5 to the $M^{th}$ pixel row 5, and if it is determined that the scanning driving circuit 6 is in the scanning process, transmit a first instruction, or if it is determined that the scanning driving circuit 6 is not in the scanning process, transmit a second instruction. The first control unit 24 is electrically connected to the first determining unit 23, and is configured to: when receiving the first instruction, control, only after the scanning driving circuit 6 outputs the scanning signal to the $M^{th}$ pixel row 5 after waiting, the display panel 100 to enter the trigger state, or when receiving the second instruction, directly control the display panel 100 to enter the trigger state.

When it is monitored that the display panel receives the fingerprint recognition requirement, in this embodiment of the present disclosure, a scanning status of the scanning driving circuit 6 is determined. The scanning driving circuit 6 enters the trigger state after outputting the scanning signal to the $M^{th}$ pixel row 5, so that a scanning process in the first mode and a scanning process in the trigger state are mutually staggered, and in the trigger state, a data line transmits a data signal to only one pixel row 5 of the $x^{th}$ pixel row to the $M^{th}$ pixel row or the $x^{th}$ pixel row to the $y^{th}$ pixel row at a same moment, to improve transmission accuracy of the data signal, thereby avoiding impact, on display and brightness improvement of the display panel, caused by chaotic transmission of the data signal.

Figure 26:
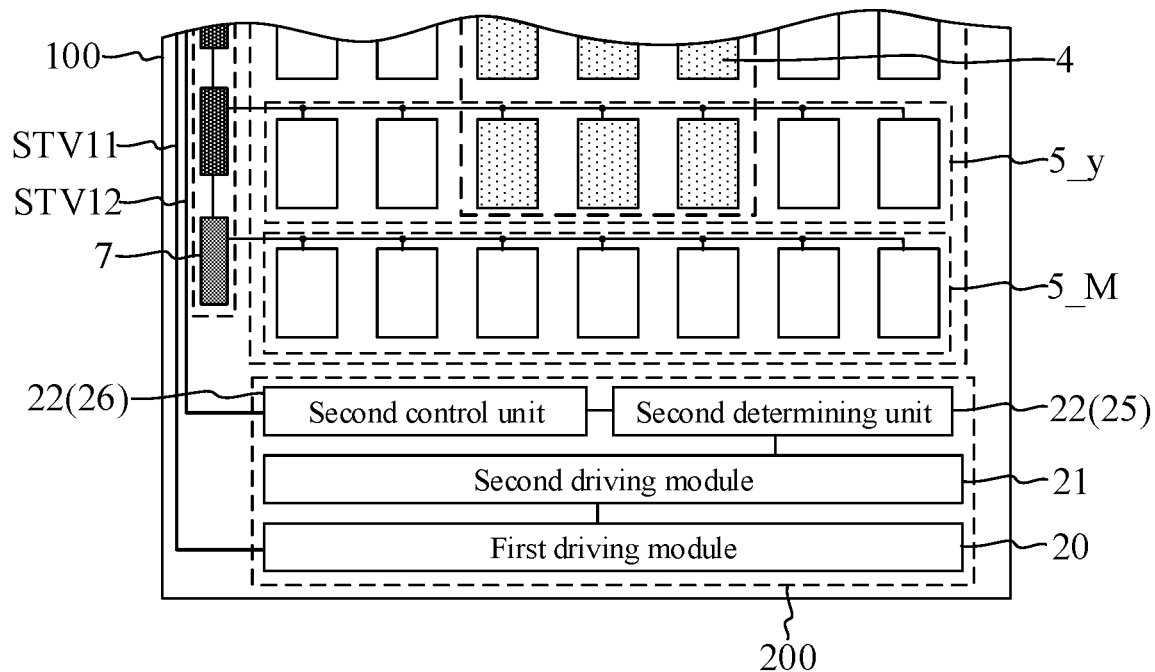
FIG. 26 is yet another schematic diagram of a display apparatus according to an embodiment of the present disclosure.

FIG. 26 is yet another schematic diagram of a display apparatus according to an embodiment of the present disclosure. In another embodiment, as shown in FIG. 26, the third driving module 22 includes a second determining unit 25 and a second control unit 26. The second determining unit 25 is electrically connected to the second driving module 21, and is configured to: when receiving the trigger instruction, determine whether the scanning driving circuit 6 is performing scanning and in the scanning process during which the scanning driving circuit 6 outputs the scanning signal to the $(x+1)^{th}$ pixel row 5 to the $M^{th}$ pixel row 5, and if it is determined that the scanning driving circuit 6 is performing scanning and in the scanning process, transmit a third instruction, or if it is determined that the scanning driving circuit 6 is not performing scanning and is not in the scanning process, transmit a fourth instruction. The second control unit 26 is electrically connected to the second determining unit 25, and is configured to: when receiving the third instruction, directly control the display panel 100 to enter the trigger state, or when receiving the second instruction, control, only after the scanning driving circuit 6 outputs the scanning signal to the $M^{th}$ pixel row 5 after waiting, the display panel 100 to enter the trigger state.

With such driving manner, after receiving the fingerprint recognition requirement, the scanning driving circuit 6 can directly enter the trigger state in the scanning process of outputting the scanning signal to the $(x+1)^{th}$ pixel row 5 to the $M^{th}$ pixel row 5, to shorten a time interval between receiving the fingerprint recognition requirement and entering the trigger state, thereby shortening a recognition response time to some extent.

With such driving manner, scanning in the trigger state is directly performed when scanning in the first mode does not end. Although a case in which the data line simultaneously transmits the data signal to two pixel rows 5 occurs, because the first subpixels 4 in the trigger state are refreshed at a very high rate, the data signal on the data line is also refreshed very quickly, and the data signal transmitted on the data line does not remain at a fixed electric potential for an excessively long time. Therefore, image display and brightness improvement are not severely affected. Compared with that scanning in the trigger state is performed when the scanning driving circuit 6 outputs the scanning signal to the $1^{st}$ pixel row 5 to the $x^{th}$ pixel row 5, in the foregoing driving manner, scanning in the trigger state is performed only after scanning performed by the scanning driving circuit 6 on the $x^{th}$ pixel row 5 ends. A quantity of remaining pixel rows 5 that are not scanned in the scanning process in the first mode is relatively small. Therefore, in the trigger state, there are relatively few cases in which the data line simultaneously transmits the data signal to two pixel rows 5, so that impact of the data signal on image display and brightness improvement is smaller.

Figure 27:
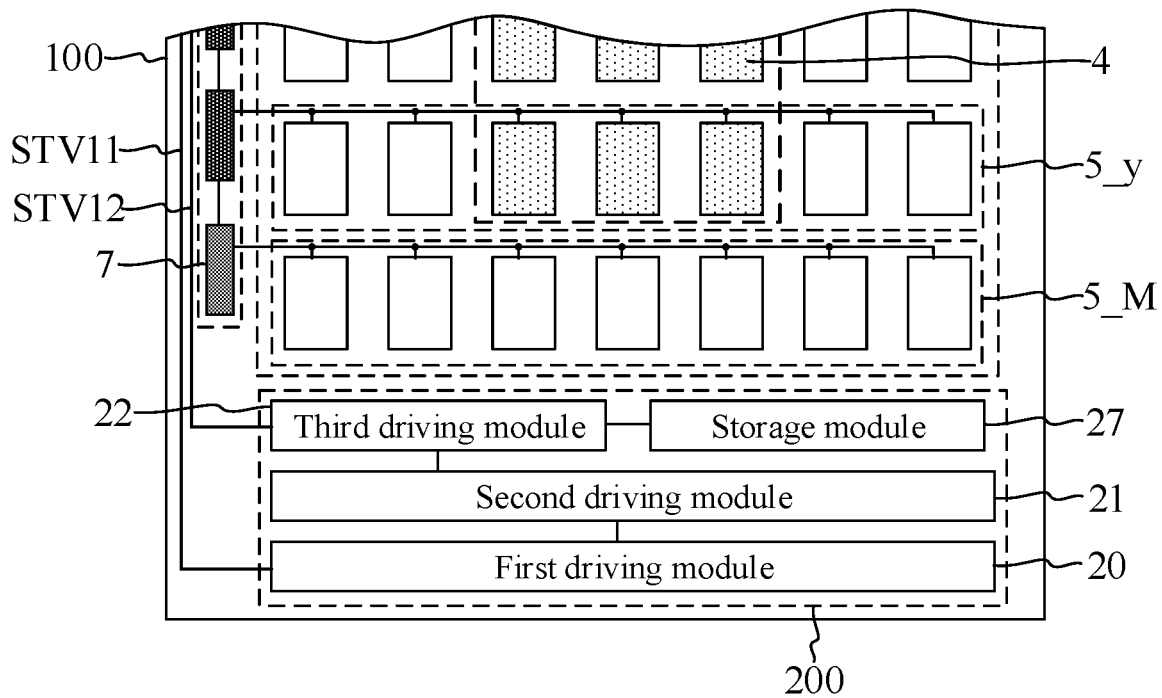
FIG. 27 is yet another schematic diagram of a display apparatus according to an embodiment of the present disclosure.

FIG. 27 is yet another schematic diagram of a display apparatus according to an embodiment of the present disclosure. In an embodiment, as shown in FIG. 27, the driving chip 200 further includes a storage module 27 configured to pre-store a quantity n of times of high frequency scanning, where one time of scanning process in which the scanning driving circuit 6 successively outputs, in response to the second scanning frame start signal, the scanning signal to at least the $x^{th}$ pixel row 5 to the $y^{th}$ pixel row 5 is one time of high frequency scanning, where n is a positive integer greater than or equal to 1. The third driving module 22 is further electrically connected to the storage module 27, and is further configured to: under control of the trigger instruction, perform n times of high frequency scanning on the first subpixels 4.

The quantity n of times of high frequency scanning is preset, so that after entering the trigger state, the display panel directly performs n times of high frequency scanning on the first subpixels 4. In this case, the fingerprint recognition region 2 can achieve a required brightness threshold. There is no need to monitor in real-time, in the trigger state, brightness of the fingerprint recognition region 2, and a driving manner is simpler and more convenient.

Figure 28:
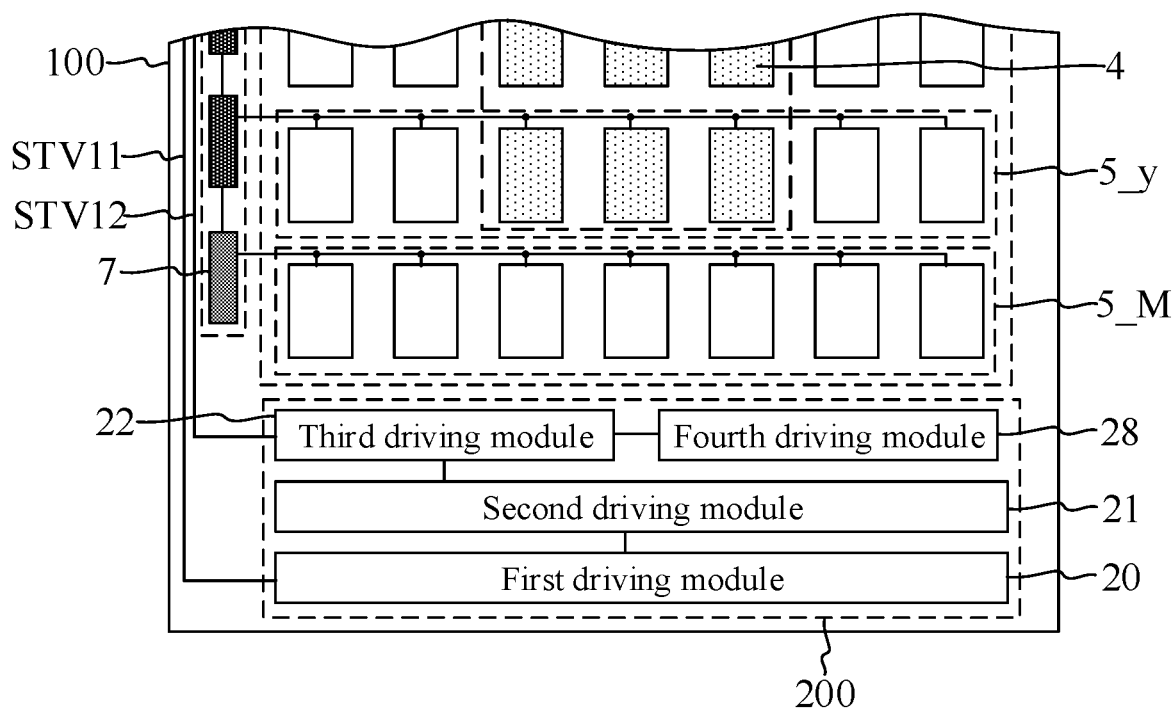
FIG. 28 is yet another schematic diagram of a display apparatus according to an embodiment of the present disclosure.

FIG. 28 is yet another schematic diagram of a display apparatus according to an embodiment of the present disclosure. In an embodiment, as shown in FIG. 28, the driving chip 200 further includes a fourth driving module 28. The fourth driving module 28 is electrically connected to the third driving module 22, and is configured to: after the third driving module 22 controls the display panel 100 to be in the trigger state, control the display panel to enter a fingerprint recognition state, where a start moment of the fingerprint recognition state is later than a start moment of the trigger state, and earlier than an end moment of the trigger state. Therefore, enough brightness improvement time for the first subpixels 4 is reserved, and when fingerprint recognition is performed, light rays, with enough brightness, incident to a finger in the fingerprint recognition region 2 are ensured, so that a fingerprint image acquired by a fingerprint recognition module is clearer, and recognition precision is higher.

The above descriptions are merely some embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for driving a display panel, wherein the display panel has a display region comprising a fingerprint recognition region and comprises subpixels located in the display region and an emission driving circuit, and the subpixels comprise first subpixels located in the fingerprint recognition region and are used as a light source for fingerprint recognition;

wherein the display panel has working modes comprising a first mode and a second mode, wherein the subpixels are scanned at a first frequency in the first mode, and the subpixels are scanned at a second frequency in the second mode, wherein the second frequency is greater than the first frequency; and wherein the method comprises:
when the display panel is in the first mode, monitoring whether the display panel receives a fingerprint recognition requirement, and if it is monitored that the display panel receives the fingerprint recognition requirement, controlling the display panel to enter a trigger state; and when the display panel is in the trigger state, scanning the first subpixels at a frequency greater than the first frequency;

wherein the display panel further comprises:

M pixel rows, wherein each of the M pixel rows comprises at least two of the subpixels arranged along a row direction, and the first subpixels are located in an $x^{th}$ pixel row of the M pixel rows to a $y^{th}$ pixel row of the M pixel rows, wherein $1 \leq x < y \leq M$, and M is a positive integer greater than 1; and wherein the emission driving circuit is electrically connected to a first emission frame start signal line, a second emission frame start signal line, and the M pixel rows, wherein, when the display panel is in the first mode, the method further comprises: successively outputting, by the emission driving circuit in response to a first emission frame start signal, an emission signal to the $1^{st}$ pixel row to the $M^{th}$ pixel row, and wherein, when the display panel enters the trigger state, the method further comprises: successively outputting, by the emission driving circuit in response to a second emission frame start signal, the emission signal to at least the $x^{th}$ pixel row to the $y^{th}$ pixel row; and wherein, when the display panel is in the first mode, a frequency at which the emission driving circuit outputs the emission signal is greater than the first frequency, and wherein, when the display panel enters the trigger state, the frequency at which the emission driving circuit outputs the emission signal is equal to the frequency at which the first subpixels are scanned.

2. The method according to claim 1, wherein the display panel further comprises:

a scanning driving circuit electrically connected to a first scanning frame start signal line, a second scanning frame start signal line, and the M pixel rows; and wherein when the display panel is in the first mode, the scanning driving circuit successively outputs, in response to a first scanning frame start signal provided by the first scanning frame start signal line, a scanning signal to a $1^{st}$ pixel row of the M pixel rows to an $M^{th}$ pixel row of the M pixel rows, and when the display panel is in the trigger state, the scanning driving circuit successively outputs, in response to a second scanning frame start signal provided by the second scanning frame start signal line, the scanning signal to at least the $x^{th}$ pixel row to the $y^{th}$ pixel row.

3. The method according to claim 2, wherein the scanning driving circuit comprises N1 first scanning shift units that are cascaded, wherein the N1 first scanning shift units are electrically connected to the M pixel rows, and an $i^{th}$ first scanning shift unit of the N1 first scanning shift units is electrically connected to the $x^{th}$ pixel row, wherein N1 is a positive integer greater than 1, and $1 \leq i < N1$;

the first scanning frame start signal line is electrically connected to a $1^{st}$ first scanning shift unit of the N1 first scanning shift units, and the second scanning frame start signal line is electrically connected to the $i^{th}$ first scanning shift unit;

said the scanning driving circuit successively outputting the scanning signal to the $1^{st}$ pixel row to the $M^{th}$ pixel row comprises: providing, by the first scanning frame start signal line, an effective level, and providing, by the second scanning frame start signal line, a non-effective level in such a manner that the N1 first scanning shift units are controlled to successively output the scanning signal to the $1^{st}$ pixel row to the $M^{th}$ pixel row; and said the scanning driving circuit successively outputting the scanning signal to at least the $x^{th}$ pixel row to the $y^{th}$ pixel row comprises: providing, by the second scanning frame start signal line, an effective level in such a manner that the $i^{th}$ first scanning shift unit to an $(N1)^{th}$ first scanning shift unit of the N1 first scanning shift units are controlled to successively output the scanning signal to the $x^{th}$ pixel row to the $M^{th}$ pixel row.

4. The method according to claim 2, wherein the second scanning frame start signal line is connected to a first suppression module in series; and in a process in which the scanning driving circuit successively outputs, in response to the first scanning frame start signal, the scanning signal to the $1^{st}$ pixel row to the $M^{th}$ pixel row, the first suppression module is configured to suppress signal transmission on the second scanning frame start signal line.

5. The method according to claim 2, wherein if it is monitored that the display panel receives the fingerprint recognition requirement, the method further comprises:

determining whether the scanning driving circuit is in a scanning process where the scanning driving circuit is outputting the scanning signal to the $1^{st}$ pixel row to the $M^{th}$ pixel row; and if it is determined that the scanning driving circuit is in the scanning process, waiting for the scanning driving circuit to output the scanning signal to the $M^{th}$ pixel row and then controlling the display panel to enter the trigger state; or if it is determined that the scanning driving circuit is not in the scanning process, directly controlling the display panel to enter the trigger state.

6. The method according to claim 2, wherein if it is monitored that the display panel receives the fingerprint recognition requirement, the method further comprises:

determining whether the scanning driving circuit is performing scanning and is in a scanning process where the scanning driving circuit outputs the scanning signal to an $(x+1)^{th}$ pixel row of the M pixel rows to the $M^{th}$ pixel row; and if it is determined that the scanning driving circuit is performing scanning and is in the scanning process, directly controlling the display panel to enter the trigger state; or if it is determined that the scanning driving circuit is not performing scanning or is not in the scanning process, waiting for the scanning driving circuit to output the scanning signal to the $M^{th}$ pixel row and then controlling the display panel to enter the trigger state.

7. The method according to claim 2, further comprising:

pre-storing a number n of times of high frequency scanning, wherein n is a positive integer greater than or equal to 1, wherein one time of scanning process during which the scanning driving circuit successively outputs, in response to the second scanning frame start signal, the scanning signal to the $x^{th}$ pixel row to the $y^{th}$ pixel row is one time of high frequency scanning; and when the display panel is in the trigger state, performing n times of high frequency scanning on the first subpixels.

8. The method according to claim 7, wherein, when n>1, in processes of the n times of high frequency scanning, the first subpixels are scanned at a same frequency.

9. The method according to claim 7, wherein, when n>1, in processes of at least two times of high frequency scanning, the first subpixels are scanned at different frequencies.

10. The method according to claim 7, wherein, when n>1 and the display panel is in the trigger state, the method further comprises:
successively outputting, by the scanning driving circuit in response to the first scanning frame start signal, the scanning signal to the $1^{st}$ pixel row to the $M^{th}$ pixel row; and
after a $k^{th}$ time of high frequency scanning of the n times of high frequency scanning ends, determining whether the scanning driving circuit is in a scanning process where the scanning driving circuit outputs the scanning signal to the $1^{st}$ pixel row to the $M^{th}$ pixel row, and, if it is determined that the scanning driving circuit is in the scanning process, waiting for the scanning driving circuit to output the scanning signal to the $M^{th}$ pixel row and then performing a $(k+1)^{th}$ time of high frequency scanning of the n times of high frequency scanning, or if it is determined that the scanning driving circuit is not in the scanning process, directly performing the $(k+1)^{th}$ time of high frequency scanning, wherein k=1, . . . , and (n−1).

11. The method according to claim 7, wherein when n>1 and the display panel is in the trigger state, the method further comprises:
successively outputting, by the scanning driving circuit in response to the first scanning frame start signal, the scanning signal to the $1^{st}$ pixel row to the $M^{th}$ pixel row; and
after a $k^{th}$ time of high frequency scanning of the n times of high frequency scanning ends, determining whether the scanning driving circuit is performing scanning and is in a scanning process where the scanning driving circuit outputs the scanning signal to an $(x+1)^{th}$ pixel row of the M pixel rows to the $M^{th}$ pixel row, and if it is determined that the scanning driving circuit is performing scanning and is in the scanning process, directly performing a $(k+1)^{th}$ time of high frequency scanning of the n times of high frequency scanning, or if it is determined that the scanning driving circuit is not performing scanning and is not in the scanning process, waiting for the scanning driving circuit to output the scanning signal to the $M^{th}$ pixel row and then performing the $(k+1)^{th}$ time of high frequency scanning, wherein k=1, . . . , and (n−1).

12. The method according to claim 1, wherein the first frequency is f1, f1≤60 Hz, the second frequency is f2, 60 Hz<f2≤$f_{max}$, and $f_{max}$ is a maximum scanning frequency of the display panel; and
when the display panel is in the trigger state, the frequency at which the first subpixels are scanned is f3, where f3=$f_{max}$.

13. The method according to claim 1, further comprising:
after the display panel enters the trigger state, controlling the display panel to enter a fingerprint recognition state, wherein a start moment of the fingerprint recognition state is later than a start moment of the trigger state.

14. The method according to claim 13, wherein after the trigger state ends, the display panel is controlled to enter the fingerprint recognition state.

15. The method according to claim 13, wherein, when the display panel is in the fingerprint recognition state, a frequency at which the subpixels are scanned is equal to the first frequency or the second frequency, or the frequency at which the subpixels are scanned is greater than the first frequency and smaller than the second frequency.

16. The method according to claim 13, wherein a data voltage received by at least one of the first subpixels in the trigger state is smaller than a data voltage received by the at least one of the first subpixels in the fingerprint recognition state.

17. The method according to claim 16, wherein in a process of the trigger state, a data voltage received by each of the first subpixels remains constant.

18. The method according to claim 16, wherein one time of scanning process during which the scanning driving circuit successively outputs, in response to a second scanning frame start signal, the scanning signal to at least the $x^{th}$ pixel row to the $y^{th}$ pixel row is one time of high frequency scanning; and
when the display panel is in the trigger state, n times of high frequency scanning is performed on the first subpixels, wherein n is a positive integer greater than or equal to 1, and a data voltage received by the first subpixels during a $k^{th}$ time of high frequency scanning of the n times of high frequency scanning is greater than a data voltage received by the at least one of the first subpixels during a $(k+1)^{th}$ time of high frequency scanning of the n times of high frequency scanning, wherein k=1, 2, . . . , and (n−1).

19. A display apparatus, comprising:
a display panel, wherein the display panel has a display region comprising a fingerprint recognition region and comprises subpixels located in the display region and an emission driving circuit, and the subpixels comprise first subpixels located in the fingerprint recognition region and are used as a light source for fingerprint recognition; and
a driving chip,
wherein the driving chip is configured to:
control the display panel to be in a first mode such that the display panel scans the subpixels at a first frequency, or control the display panel to be in a second mode such that the display panel scans the subpixels at a second frequency, wherein the second frequency is greater than the first frequency;
monitor, when the display panel is in the first mode, whether the display panel receives a fingerprint recognition requirement, and if it is determined that the display panel receives the fingerprint recognition requirement, transmit a trigger instruction; and
after receiving the trigger instruction, control the display panel to be in a trigger state in such a manner that the display panel scans the first subpixels at a frequency greater than the first frequency;
wherein the display panel further comprises:
M pixel rows, wherein each of the M pixel rows comprises at least two of the subpixels arranged along a row direction, and the first subpixels are located in an $x^{th}$ pixel row of the M pixel rows to a $y^{th}$ pixel row of the M pixel rows, wherein 1≤x<y≤M, and M is a positive integer greater than 1; and
wherein the emission driving circuit is electrically connected to a first emission frame start signal line, a second emission frame start signal line, and the M pixel rows,
wherein, when the display panel is in the first mode, the method further comprises: successively outputting, by the emission driving circuit in response to a first emission frame start signal, an emission signal to the $1^{st}$ pixel row to the $M^{th}$ pixel row, and
wherein, when the display panel enters the trigger state, the method further comprises: successively outputting, by the emission driving circuit in response to a second emission frame start signal, the emission signal to at least the $x^{th}$ pixel row to the $y^{th}$ pixel row; and wherein, when the display panel is in the first mode, a frequency at which the emission driving circuit outputs the emission signal is greater than the first frequency, and wherein, when the display panel enters the trigger state, the frequency at which the emission driving circuit outputs the emission signal is equal to the frequency at which the first subpixels are scanned.

* * * * *